United States Patent [19]
Takekoshi et al.

[11] Patent Number: 5,691,764
[45] Date of Patent: Nov. 25, 1997

[54] APPARATUS FOR EXAMINING TARGET OBJECTS SUCH AS LCD PANELS

[75] Inventors: Kiyoshi Takekoshi; Shinji Iino; Itaru Iida, all of Yamanashi-ken, Japan

[73] Assignee: Tokyo Electron Limited, Tokyo, Japan

[21] Appl. No.: 510,669

[22] Filed: Aug. 3, 1995

[30] Foreign Application Priority Data

| Aug. 5, 1994 | [JP] | Japan | 6-184375 |
| Oct. 14, 1994 | [JP] | Japan | 6-249483 |

[51] Int. Cl.$^6$ .................................................. H04N 7/18
[52] U.S. Cl. ................... 348/86; 348/87; 348/88; 348/125; 348/126; 324/158
[58] Field of Search ................... 348/86, 87, 88, 348/125, 126; 324/158, 758, 754; 364/559, 489

[56] References Cited

U.S. PATENT DOCUMENTS

| 5,166,603 | 11/1992 | Hoshi | 324/158 |
| 5,404,111 | 4/1995 | Mori et al. | 324/758 |
| 5,465,052 | 11/1995 | Henley | 324/770 |
| 5,539,676 | 7/1996 | Yamaguchi | 364/559 |

FOREIGN PATENT DOCUMENTS 2-25764   1/1990   Japan .

Primary Examiner—Tommy P. Chin
Assistant Examiner—Anand S. Rao
Attorney, Agent, or Firm—Oblon, Spivak, McClelland, Maier & Neustadt, P.C.

[57] ABSTRACT

A probe apparatus incorporated into a lighting inspection system for LCD panels, includes a store section, a process section, and a transfer section interposed between them. An examination mechanism having a probe card is arranged in an examination area of the process section. Right and left alignment areas are formed so as to interpose the examination area, and right and left work tables on which the LCD panels are to be loaded, are arranged on the right and left alignment areas, respectively. The movement of the right and left work tables is controlled by a controller, and the LCD panels on the right and left work tables are alternately examined in the examination area by the examination mechanism.

19 Claims, 15 Drawing Sheets

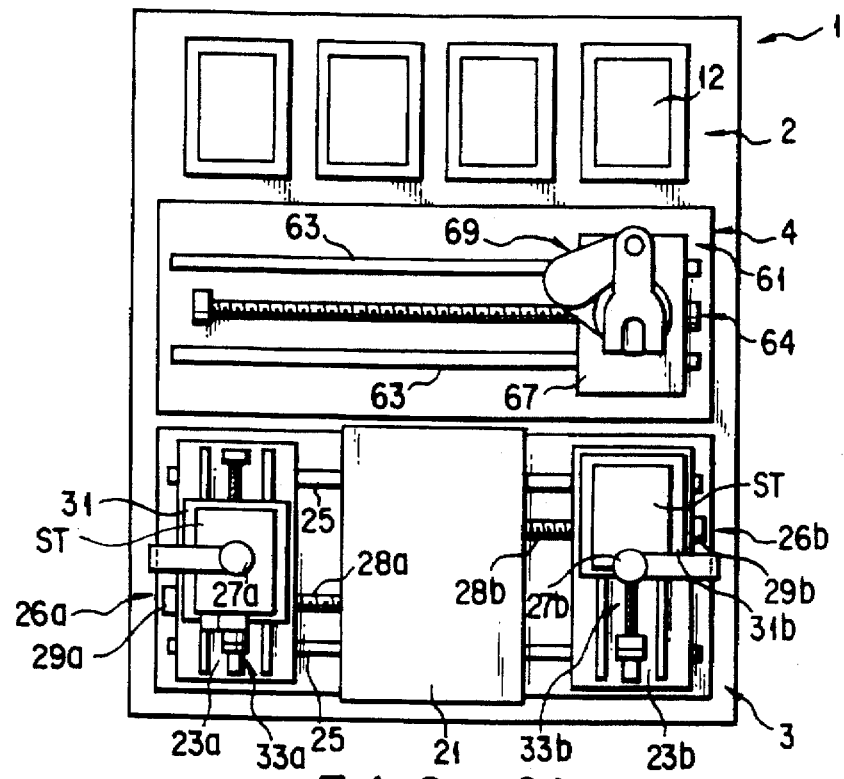
F I G. 6A
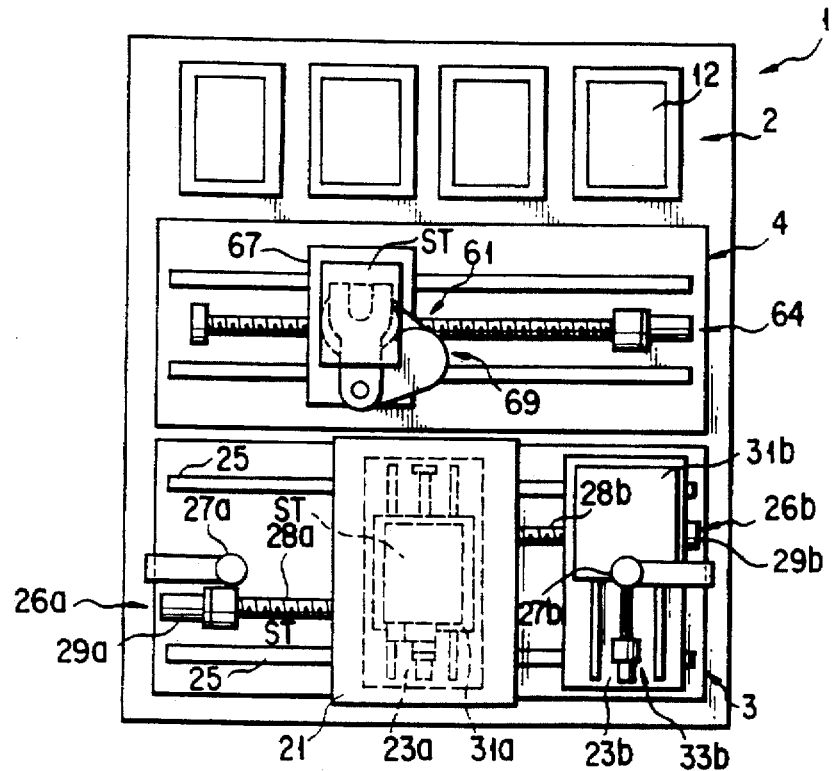
F I G. 6B

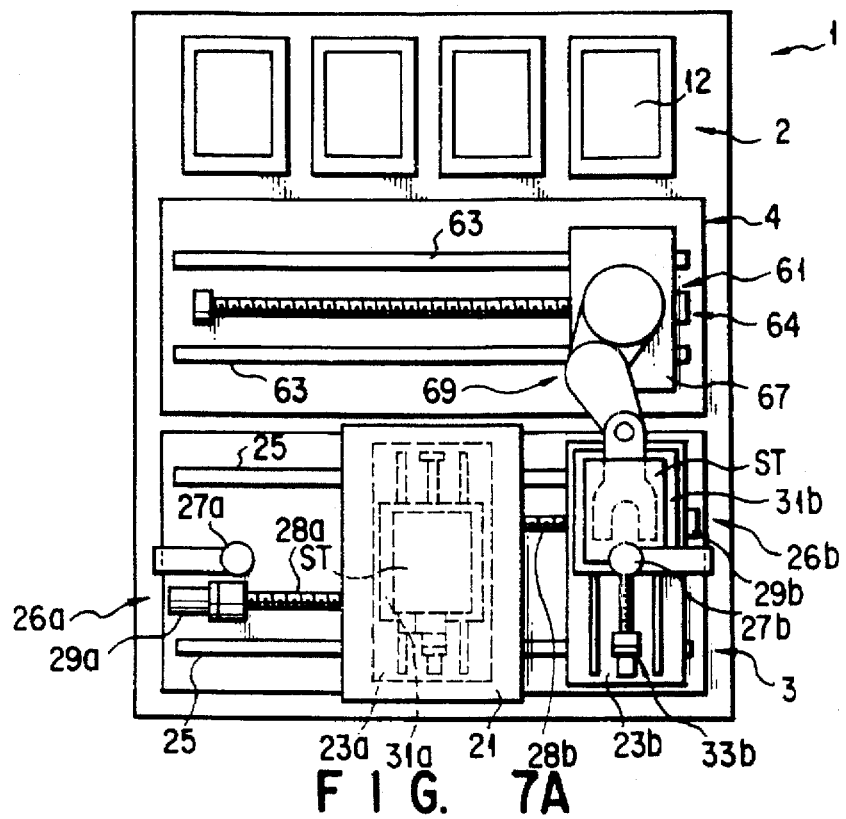
F I G. 7A
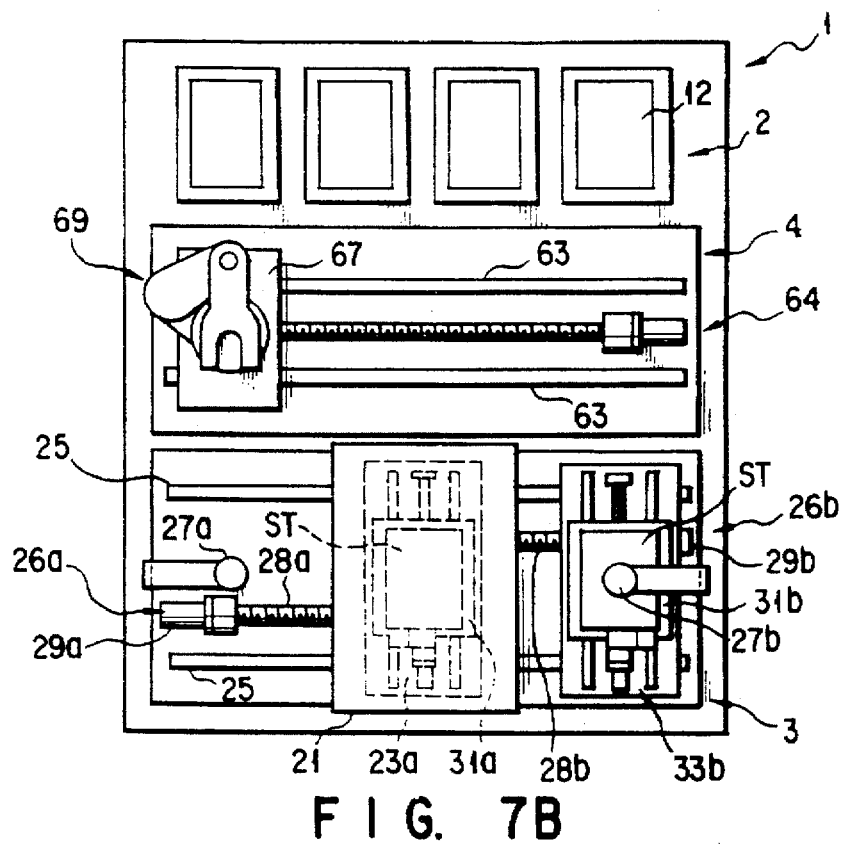
F I G. 7B

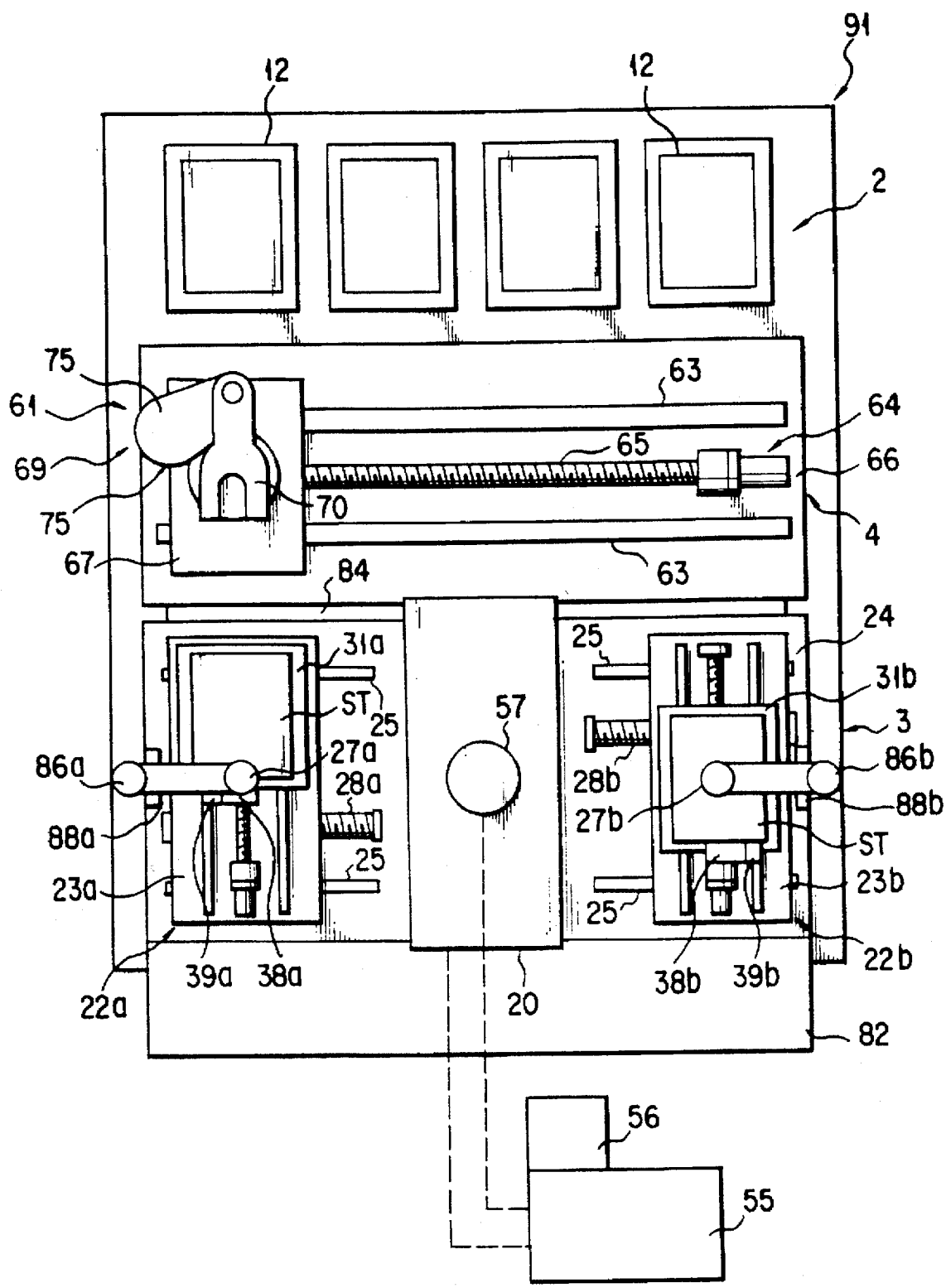
F I G. 10

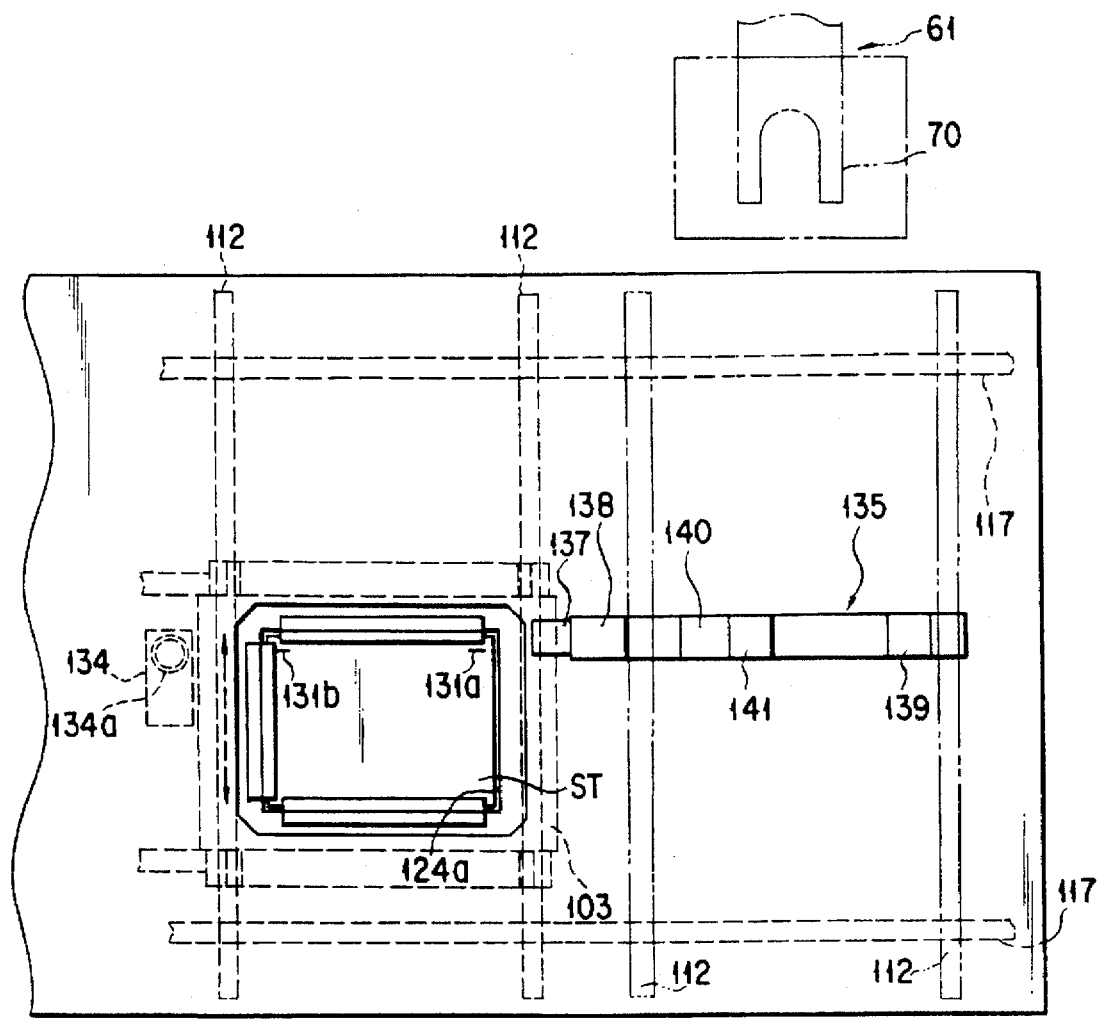
F I G. 11A
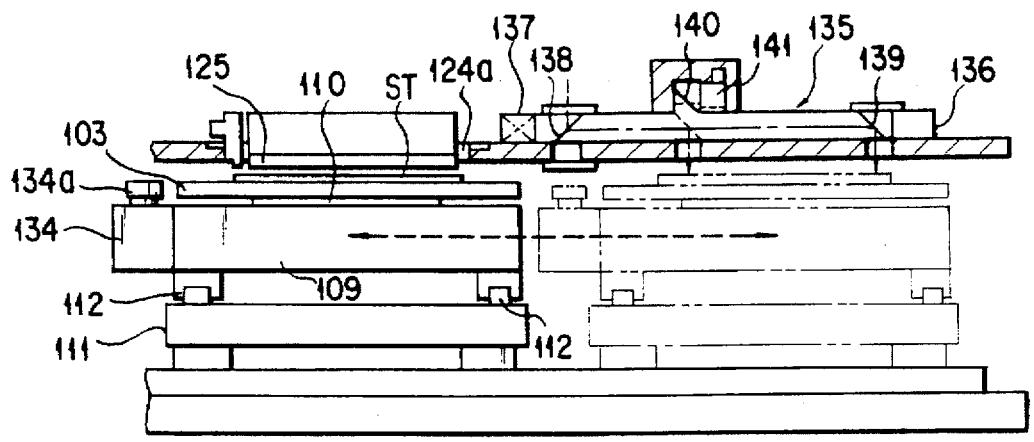
F I G. 11B

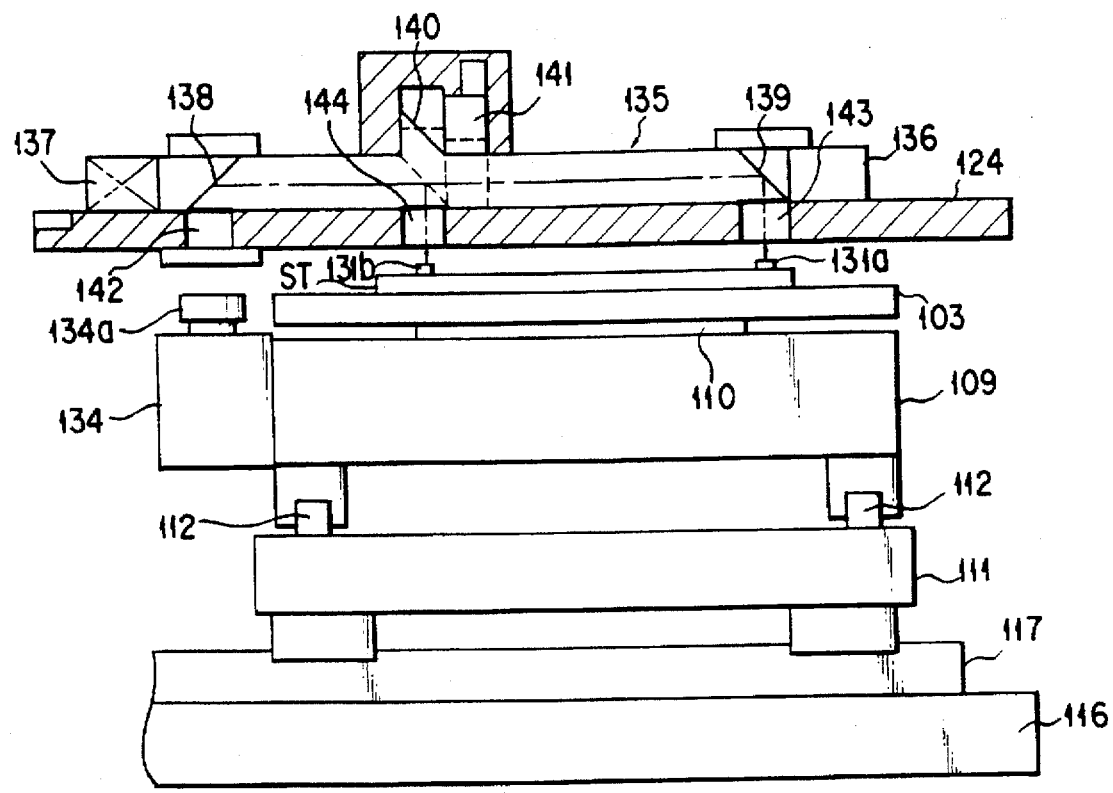
F I G. 15
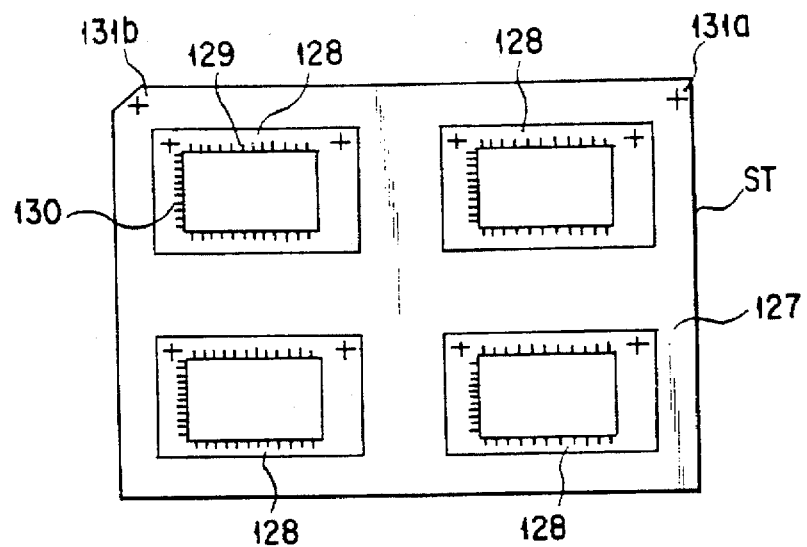
F I G. 16

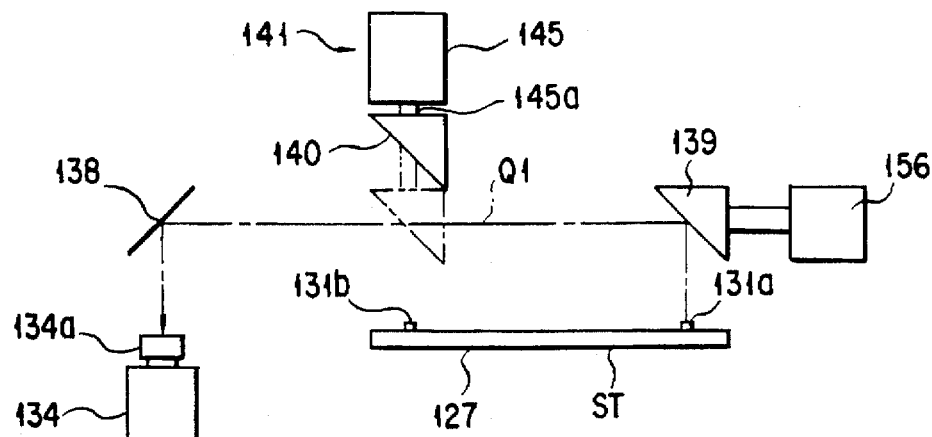
F I G. 20A
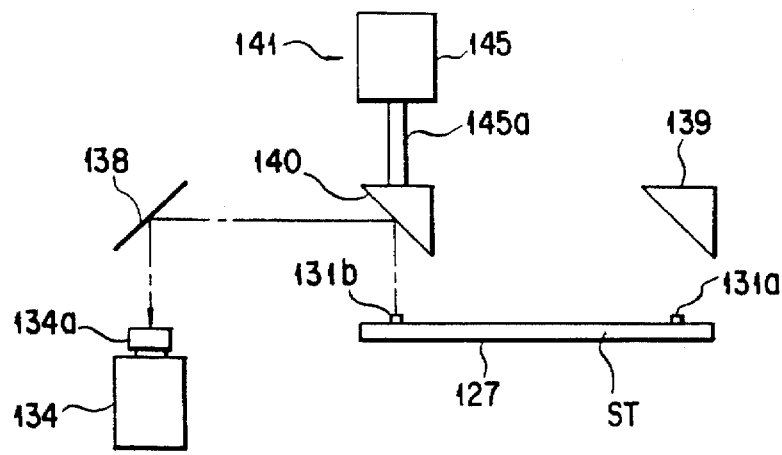
F I G. 20B
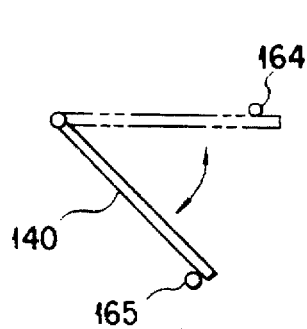
F I G. 21A
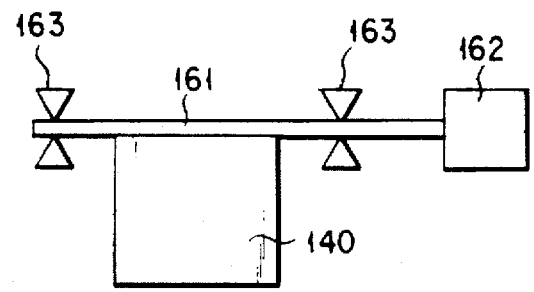
F I G. 21B

APPARATUS FOR EXAMINING TARGET OBJECTS SUCH AS LCD PANELS

BACKGROUND OF THE INVENTION

1. Field of the Invention

The present invention relates to an apparatus for examining plate-like target objects such as LCD (liquid crystal display) panels and semiconductor wafers.

2. Description of the Related Art

Generally, in the process of manufacturing, e.g., a TFT-LCD panel, an examination of electrical functions of the LCD panel, a short-open examination of an electric circuit incorporated into the LCD panel, and the like are performed at an appropriate time, as is a lighting inspection for displaying a pattern on a semi-finished product in which liquid crystal has been sealed. An examination apparatus for examining a plate-like target object such as an LCD panel has been conventionally known from Jpn. Pat. Appln. KOKAI Publication No. 2-25764.

The examination apparatus includes a cassette for storing a plurality of LCD panels to be examined, a transfer mechanism for taking one of the LCD panels from the cassette and loading it onto a work table in a reception section thereof, and a moving mechanism for aligning the LCD panel placed on the work table and moving it to an examination area.

While the examination apparatus is running, one of the LCD panels to be examined is taken out of the cassette by the transfer mechanism. The LCD panel is supplied to the examination area by means of the moving mechanism and undergoes a predetermined examination therein. The examined LCD panel is returned from the examination area to the cassette by the moving mechanism and transfer mechanism in the direction opposite to that in which the LCD panel is supplied.

After the examined LCD panel is returned to the cassette, a new one of the LCD panels to be examined is taken out of the cassette by means of the transfer mechanism and then supplied to the examination area through the moving mechanism in the same manner. By repeating the same operation as described above, the LCD panels to be examined are supplied to the examination area one by one and undergo a predetermined examination therein.

According to the conventional examination apparatus having the foregoing constitution, the transferring operation is repeated to examine the LCD panels contained in the cassette one by one. Consequently, an examination mechanism remains in a standby state during a period of time from when the examination of one LCD panel in the examination area is completed until when the next LCD panel is supplied to the examination area.

Since, in the conventional examination apparatus, an LCD panel to be examined has to be aligned correctly within the examination area, there occurs a problem of requiring much time for the alignment. Since, therefore, the ratio of the standby time to the time required for actually examining an LCD panel by the examination mechanism is increased, there also occurs a problem of shortening the operating time of a tester used for the examination. In most cases, an expensive tester is generally employed in the examination mechanism; thus, it is desirable to lengthen the actual operating time of the tester as much as possible.

The conventional examination apparatus also includes, for example, two cameras for aligning the LCD panels above a probe card in the position where they are examined. When an LCD panel is transferred to the examination position, both the cameras sense two alignment marks of the LCD panel and, based on information of the aligning marks, the position of the LCD panel is adjusted by driving the moving mechanism in the X and Y directions and rotating mechanism in the µ direction. After the positional adjustment of the LCD panel is completed, a stage rises up in the Z direction and electrode pads on the LCD panel are brought into contact with probe electrodes on the probe card. Where a lighting inspection is carried out, the two alignment cameras have to be retreated out of the view of an inspection camera, since the two cameras are used for alignment in the view of the inspection camera.

Since the two cameras are provided above the examination position of the examination apparatus, the constitution of that portion of the apparatus, which is located above the examination position, is complicated and an operation space thereabove is narrowed. Since, moreover, the two cameras need to be aligned at high precision, the alignment operation becomes troublesome. The alignment operation has to be performed whenever the types of the LCD panels set in the examination apparatus are changed, which causes a lot of trouble and requires a long time to start examining the LCD panels.

The probe of the probe electrode cannot be confirmed directly by the cameras which are used for picking up images of the alignment marks on the LCD panel. It is thus necessary, in the preparation of an examination, to confirm the position of the probe by marking an LCD panel with the probe or by viewing a contact portion of the probe and the electrode pad of an LCD panel through a microscope.

If, however, the LCD panels are formed of hard materials such as ITO, they cannot be marked with the probe. It may thus be difficult to align the LCD panels.

SUMMARY OF THE INVENTION

An object of the present invention is to provide an examination apparatus capable of decreasing the ratio of a time period during which an examination mechanism remains in a standby state to that during which the examination mechanism is actually examining a target object, and increasing the number of target objects which are processed per unit of time.

Another object of the present invention is to provide an examination apparatus capable of efficiently aligning target objects without narrowing an operation space formed above an examination position, and directly confirming contact means of an examination mechanism.

According to the present invention, there is provided an apparatus for examining target objects, comprising:

an examination mechanism provided within an examination area, for examining the plate-like target objects;

first and second alignment areas between which the examination area is interposed, for aligning the target objects;

first and second work tables onto which the target objects are to be loaded detachably;

driving means for moving the first and second work tables within a horizontal plane, the driving means allowing the first work table to move between the first alignment area and the examination area and allowing the second work table to move between the second alignment area and the examination area; and control means for controlling the driving means such that the first and second work tables are moved in the first and second alignment areas, respectively, to align the target objects on the first and second work tables with a predetermined state corresponding to the examination mechanism, and the target objects on the first and second work tables are alternately examined within the examination area by the examination mechanism.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 6A is a plan view showing the probe apparatus of FIG. 1 in which the LCD panel on the left work table is aligned and stands by, and the examined LCD panel on the right work table is unloaded in the reception position;

FIG. 6B is a plan view showing the probe apparatus of FIG. 1 in which the right work table stands by in the reception position during the examination of the LCD panel on the left work table;

FIG. 7A is a plan view showing the probe apparatus of FIG. 1 in which the LCD panel is loaded onto the right work table during the examination of the LCD panel on the left work table;

FIG. 7B is a plan view showing the probe apparatus of FIG. 1 in which the LCD panel on the right work table is aligned during the examination of the LCD panel on the left work table;

FIG. 10 is a plan view schematically showing the constitution of the entire probe apparatus according to still another embodiment of the present invention;

FIGS. 11A and 11B are a plan view and a longitudinal side view, respectively, both of which schematically show the constitution of part of a process section of a probe apparatus according to yet another embodiment of the present invention;

FIG. 15 is a longitudinal side view showing part of the probe apparatus of FIGS. 11A and 11B in which the work table is transferred to an alignment position;

FIG. 16 is a plan view showing an LCD panel as a target object;

FIGS. 20A and 20B are schematic views respectively showing the image pickup states of first and second marks of the LCD panel in the probe apparatus of FIGS. 11A and 11B; and FIGS. 21A and 21B are respectively side and front views each showing a modification to the mechanism for selecting a reflector of the probe apparatus of FIGS. 11A and 11B.

DETAILED DESCRIPTION OF THE PREFERRED EMBODIMENTS

Embodiments of the present invention will now be described with reference to the accompanying drawings.

Figure 1:
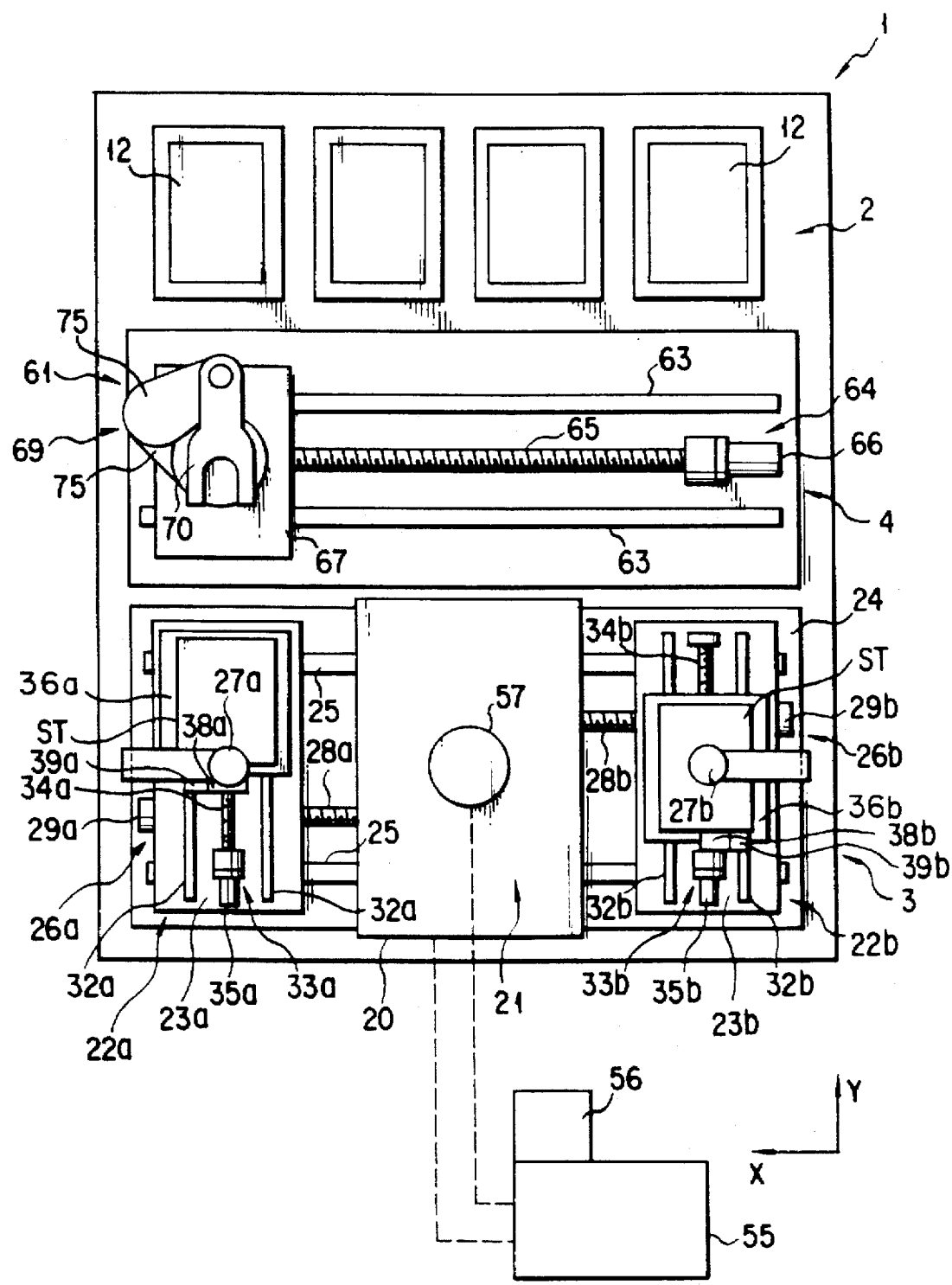
FIG. 1 is a plan view schematically showing the constitution of the entire probe apparatus according to one embodiment of the present invention.

FIG. 1 schematically shows the constitution of the whole probe apparatus 1, which is incorporated into a lighting inspection system for LCD panels, according to an embodiment of the present invention. The prober apparatus 1 includes an LCD panel (target object) store section 2, an LCD panel process section 3, and a transfer section (target object transferring means) 4 interposed between the LCD panel store section 2 and LCD panel process section 3.

Figure 2:
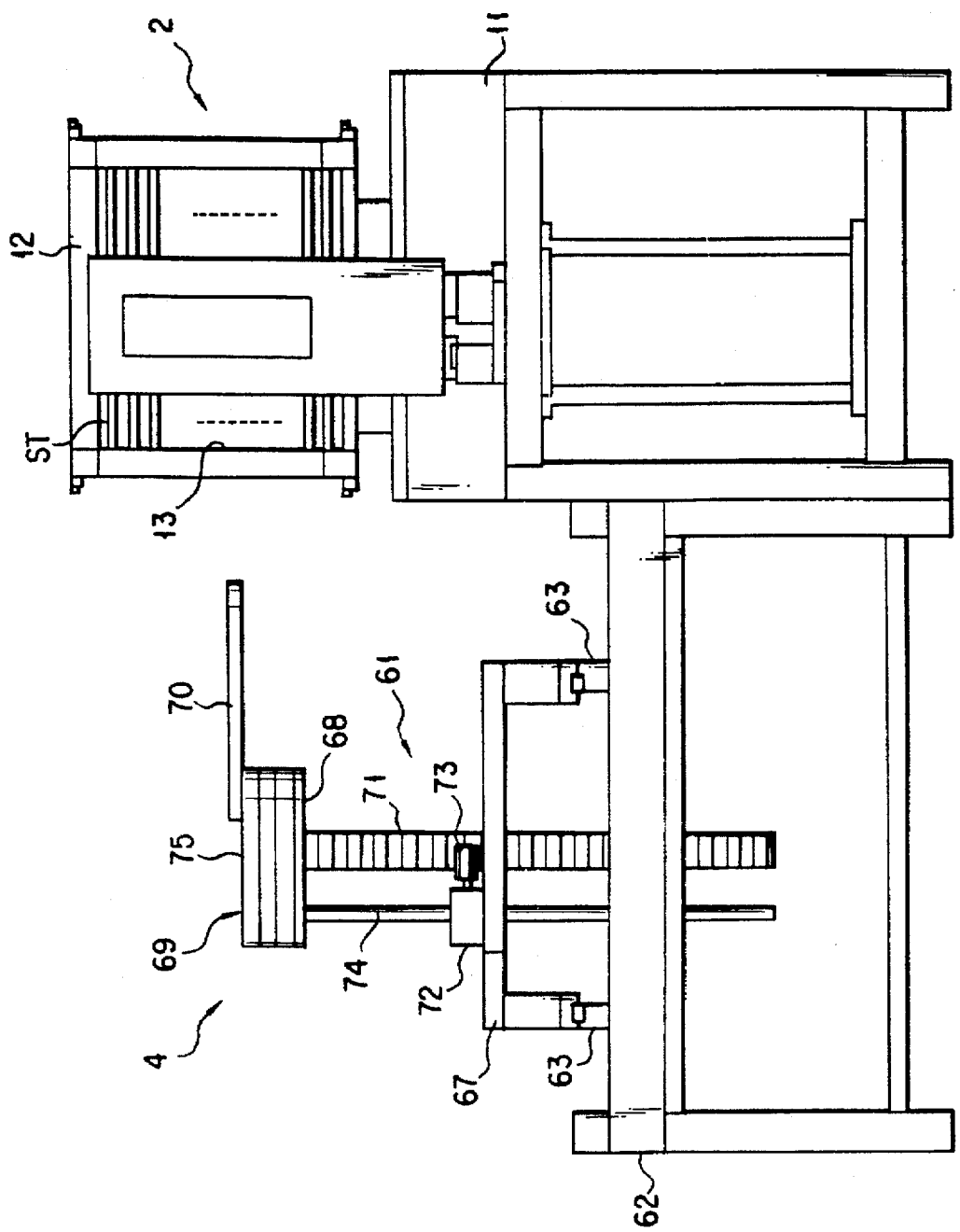
FIG. 2 is a side view showing LCD panel store and transfer sections of the probe apparatus shown in FIG. 1.

The LCD panel store section 2 is provided with a cassette work table 11, as illustrated in FIG. 2. A plurality of cassettes 12 for storing LCD panels (four cassettes in this embodiment) are arranged in line on the cassette work table 11, for example, in the direction of arrow X in FIG. 1. Each of the cassettes 12 has a number of LCD panel storing shelves 13 in a vertical direction. An LCD panel (target object) ST is stored in each of the LCD panel storing shelves such that it can be drawn therefrom in a substantially horizontal direction.

The LCD panel process section 3 includes an examination area 21 in the central portion thereof, and the examination area has an examination mechanism 20 for examining the LCD panel ST. Alignment areas 22a and 22b for aligning the LCD panel ST are arranged on both sides of the examination area 21, respectively.

As is apparent from FIG. 1, the alignment areas 22a and 22b are provided with a left stage 23a and right stage 23b, respectively, both of which are movable toward the examination area 21.

A pair of guide rails 25 are formed on a base 24 of the LCD panel process section 3 and extend in the X direction. The left ends of the guide rails 25 extend to the alignment area 22a, while the right ends thereof extend to the alignment area 22b. The left and right stages 23a and 23b are guided by these guide rails 25 and supported movably between the examination area 21 and the left and right alignment areas 22a and 22b, respectively.

The left alignment area 22a includes a left ball screw mechanism 26a for driving the left stage 23a and an optical system for aligning, e.g., a CCD camera 27a. The left ball screw mechanism 26a is provided with a ball screw 28a arranged in the X direction between the examination area 21 and left alignment area 22a, and a driving motor 29a for driving the ball screw 28a. Upon driving the left ball screw mechanism 26a, the left stage 23a moves while being guided by the guide rails 25 between the standby position within the left alignment area 22a and the panel examination position within the examination area 21.

Similarly, the right alignment area 22b includes a right ball screw mechanism 26b for driving the right stage 23b and an optical system for aligning, e.g., a CCD camera 27b. The right ball screw mechanism 26b is provided with a ball screw 28b arranged in the X direction between the examination area 21 and right alignment area 22b, and a driving motor 29b for driving the ball screw 28b. Upon driving the right ball screw mechanism 26b, the right stage 23b moves while being guided by the guide rails 25 between the standby position within the right alignment area 22b and the panel examination position within the examination area 21.

Figure 3:
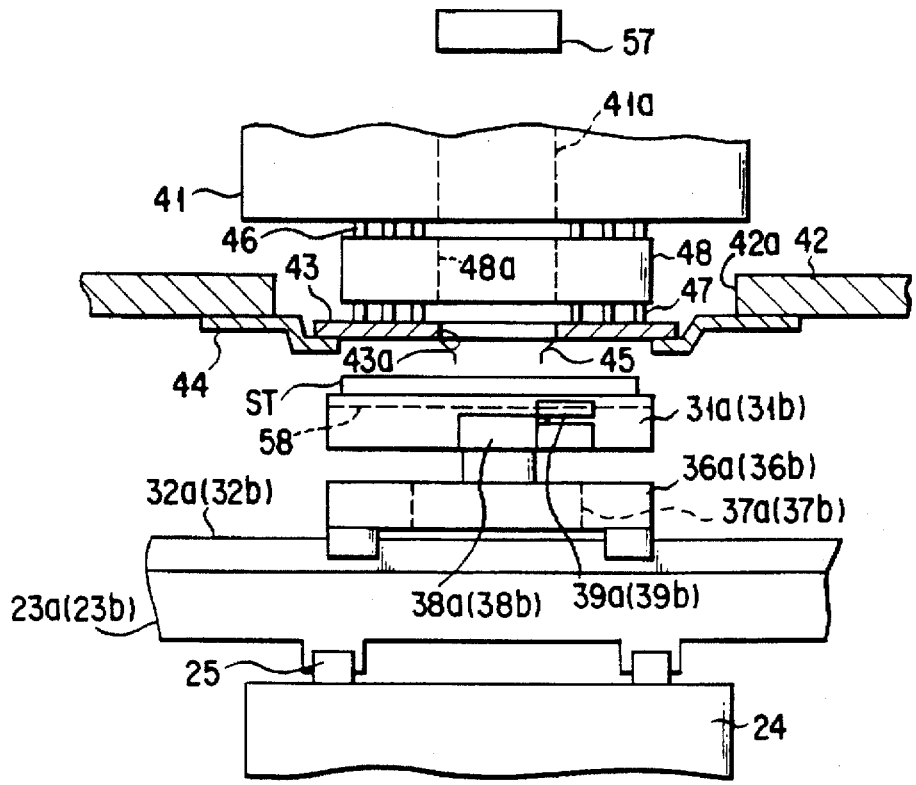
FIG. 3 is a longitudinal sectional view showing an examination area of the probe apparatus shown in FIG. 1.

A left block 36a (as shown in FIG. 3) is movably provided on the left stage 23a in the direction of arrow Y perpendicular to the X direction in FIG. 1. On the upper surface of the left stage 23a, a pair of guide rails 32a protrudes from the upper surface of the left stage 23a and extends in the Y direction, and a ball screw mechanism 33a for driving the left block 36a is formed. The ball screw mechanism 33a is provided with a ball screw 34a and a driving motor 35a for driving the ball screw 34a. Similarly, a right block 36b (as shown in FIG. 3) is movably provided as the right stage 23b.

Figure 5A:
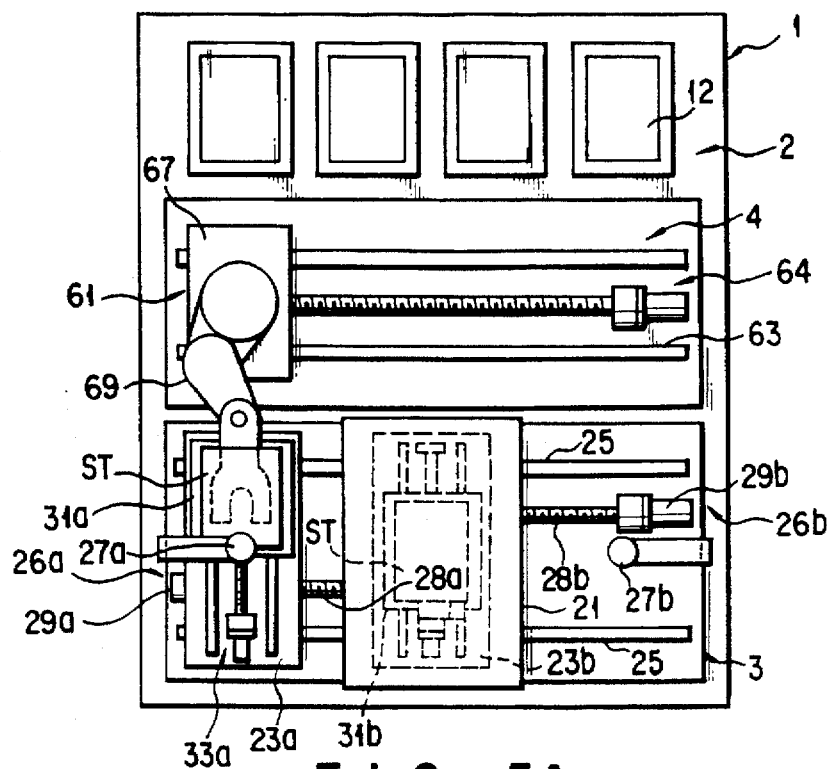
FIG. 5A is a plan view showing the probe apparatus of FIG. 1 in which during the examination of an LCD panel on the right work table, another LCD panel is supplied onto the left work table moved to a reception position.
Figure 5B:
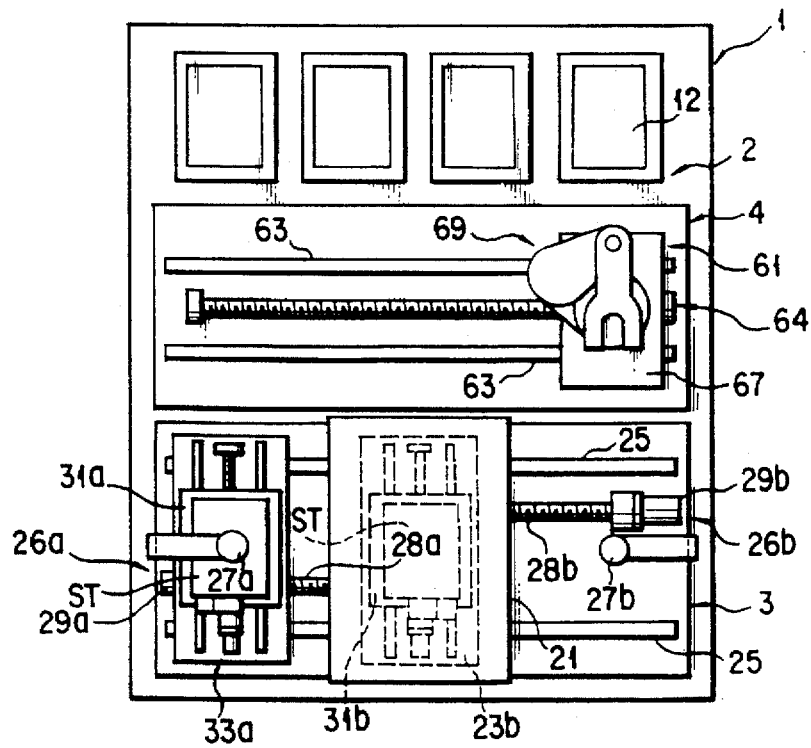
FIG. 5B is a plan view showing the probe apparatus of FIG. 1 in which the LCD panel on the left work table is aligned during the examination of the LCD panel on the right work table.

As is illustrated in FIG. 3, a left work table 31a having a chuck for holding the LCD panel ST is provided in the left block 36a. Upon drive of the ball screw mechanism 33a, the left block 36a as well as the left work table 31a moves in the Y direction while being guided by the guide rails 32a between the panel reception position near the distal end of the transfer section 4, as shown in FIG. 5A, and the alignment position substantially at the central position of the left stage 23a, as shown in FIG. 5B. When the left work table 31a moves to the alignment position, the LCD panel ST on the work table 31a is located just under the CCD camera 27a.

The left work table 31a is moved up and down in the Z-axis direction perpendicular to the X-Y plane and rotated in the θ direction around the Z axis by means of a driving section 37a included in the left block 36a and having a lifting member and a rotating member. The left work table 31a can be moved in the four directions of X, Y, Z and θ.

The left work table 31a is provided, on one side, e.g., the lower side in FIG. 1, with an optical system for aligning, e.g., a CCD camera 38a, and a retreatable optical target 39a for aligning the optical axes of the cameras 27a and 38a with each other. Steps of aligning the optical axes of the cameras 27a and 38a, and of recognizing by the camera 38a the positions of electrode pads on a probe card 43 described later are performed prior to the examination of the LCD panels ST, such as when the probe apparatus is installed. When an LCD panel ST is examined, the left work table 31a is moved to the alignment position and then images of the LCD panel ST are picked up by the upper side camera 27a, so that an optical alignment operation for the LCD panel ST can be performed by moving the left work table 31a.

A right block 36b and a right work table 31b, which have the same structures as those of the left block 36a and left work table 31a on the left stage 23a, are provided on a right stage 23b. More specifically, a pair of guide rails 32b, a ball screw mechanism 33b with a ball screw 34b and a driving motor 35b, a work table 31b, a block 36b and a driving section 37b, which correspond to the guide rails 32a, ball screw mechanism 33a with the ball screw 34a and driving motor 35a, work table 31a, block 36a and driving section 37a, respectively, on the left stage 23a, are provided on the right stage. Furthermore, the right work table 31b is provided, on one side, e.g., the lower side in FIG. 1, with an optical system for aligning, e.g., a CCD camera 38b, and a retreatable optical target 39b for aligning the optical axes of the cameras 27b and 38b with each other.

As shown in FIG. 3, the examination mechanism 20 within the examination area 21 includes a test head 41 containing a performance board (not shown) for supplying an electrical signal for a lighting inspection to the LCD panel ST. A head plate 42 is arranged under the test head 41. An opening 42a is formed in that position of the head plate 42 which is spaced away from and located opposite to the test head 41, and a card holder 44 is fixed onto the periphery of the opening 42a. In other words, a probe card 43 of the examination mechanism 20 is fixed to the head plate 42 with the card holder 44 interposed therebetween.

A number of probe electrodes 45 are protruded from the probe card 43 to contact a number of electrode pads formed on the LCD panel ST. The probe electrodes 45 are employed to send the electrical signal for the lighting inspection to the LCD panel ST and, in other words, to function as direct terminals of the examination mechanism 20. Each of the probe electrodes 45 is connected to the performance board included in the test head 41 by means of a contact ring 48, from the upper and lower surfaces thereof contact pins 46 and 47 are protruded. The performance board is connected to a tester 55 of the examination system.

Openings 41a, 48a and 43a are formed in the test head 41, contact ring 48 and probe card 43, respectively such that they are aligned with one another. A camera 57 of the examination system is provided above these openings in order to pick up an image of the LCD panel ST when the lighting inspection is performed. The camera 57 is so arranged that its optical axis is aligned with the centers of the openings 41a, 48a and 43a and its focal plane coincides with the LCD panel ST. The camera 57 is connected to the tester 55, and information of the picked-up image is displayed on a display 56 of the tester 55. Each of the work tables 31a and 31b includes a back light 58 in order to pick up an image of the LCD panel ST.

To examine the LCD panel ST in the examination area 21, one of the left and right work tables 31a and 31b is moved to the panel examination position of the examination area 21 and raised in the Z direction therein, thereby electrically contacting the probe electrodes 45 of the probe card 43 and those of the LCD panel ST.

Figure 4:
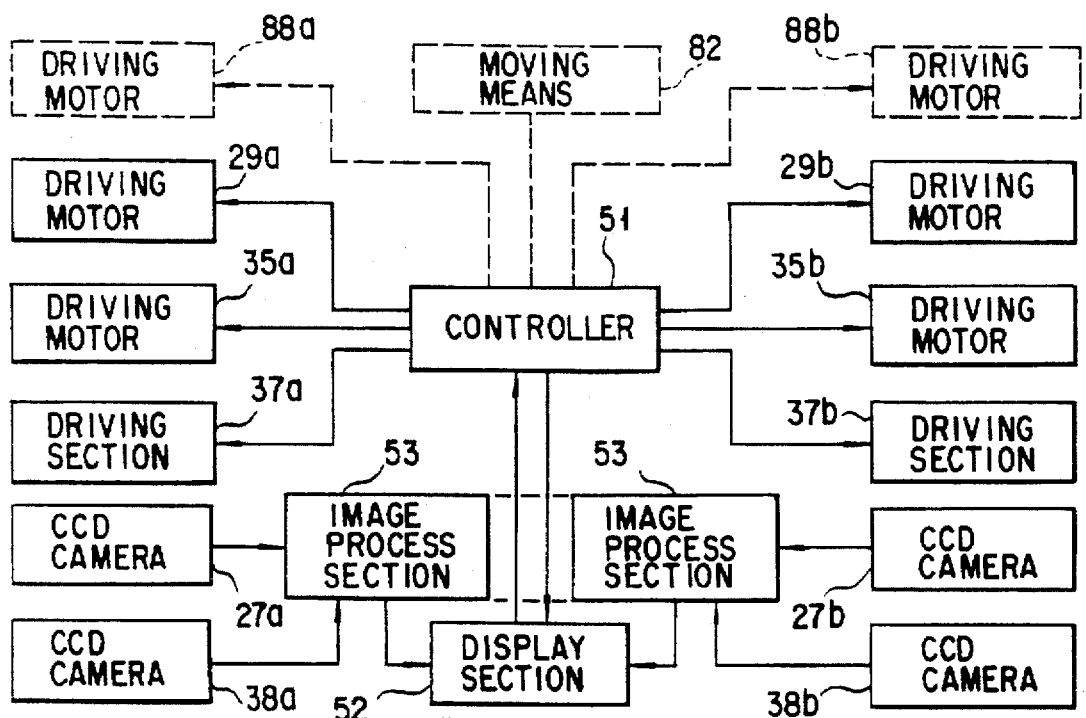
FIG. 4 is a diagram schematically showing the connecting states of a controller of the probe apparatus shown in FIG. 1.

As is shown in FIG. 4, the driving motor 29a of the left ball screw mechanism 26a, the driving motor 35a of the ball screw mechanism 33a, the driving section 37a of the work table 31a, the driving motor 29b of the right ball screw mechanism 26b, the driving motor 35b of the ball screw mechanism 33b, and the driving section 37b of the work table 31b, are connected to a controller (control means) 51 constituted by, e.g., a microcomputer and its peripheral circuits. The controller 51 drives the driving motors 29a and 29b while the work tables 31a and 31b are alternately moved to the examination area 21 for each examination of the LCD panel ST.

A display section 52 is also connected to the controller 51. The left and right CCD cameras 27a, 27b, 38a and 38b are connected to the display section 52 through an image process section 53. The image information supplied from each of the CCD cameras 27a, 27b, 38a and 38b is alternatively input into and processed by the image process section 53 and then displayed on the display section 52.

The transfer section 4 is provided with a panel transfer robot 61. A pair of guide rails 63 is formed on a base 62 of the transfer section 4 so as to extend in the X direction. The left end portions of the guide rails 63 extend to a position corresponding to the left alignment area 22a, while the right end portions thereof extend to a position corresponding to the right alignment area 22b. The panel transfer robot 61 is guided by the guide rails 63 and supported movably between positions corresponding to the left and right alignment areas 22a and 22b.

A ball screw mechanism 64 for driving the panel transfer robot 61 is provided on the base 62. The ball screw mechanism 64 includes a ball screw 65, which is arranged in the X direction between the positions corresponding to the alignment areas 22a and 22b, and a driving motor 66 for driving the ball screw 65. When the ball screw mechanism 64 is driven, the panel transfer robot 61 is operated to move while being guided by the guide rails between the positions corresponding to the alignment areas 22a and 22b.

The panel transfer robot 61 includes a moving table 67, which moves in the X direction while being guided by the guide rails 63, a support 68 arranged so as to move up and down in the Z direction with respect to the moving table 67, a robot arm 69 formed by an articulated arm attached to the support 68, and a panel holding hand 70 rotatably coupled to the distal end of the robot arm 69.

A rack 71 is projected from the support 68 in the Z direction. A pinion gear 73, which is attached to the rotation axis of a motor 72 fixed to the moving table 67, is engaged with the rack 71. When the motor 72 is driven, the rotation of the pinion gear 73 is transmitted to the rack 71, with the result that the rack 71 moves up and down and as does the support 68 in the Z direction. A guide member 74 guides the support 68 to move up and down in the Z direction.

The robot arm 69 is formed of a plurality of arm elements 75 rotatably coupled to each other by their joints. When the robot arm 69 is transformed, the panel holding hand 70 is moved in the Y direction, and the end portion of the hand 70 is inverted 180°, thus selecting a state wherein the end portion thereof is directed toward the LCD panel store section 2 or a state wherein it is directed toward the LCD panel process section 3.

An operation of the embodiment shown in FIG. 1 will now be described.

At first, in order to initialize the apparatus, the optical axes of the cameras 27a and 27b in the left and right alignment areas 22a and 22b are respectively aligned with the optical axes of the cameras 38a and 38b, by the optical targets 39a and 39b. The positions of the work tables 31a and 31b in these states are considered as left and right reference coordinate positions.

Images of two of the probe electrodes 45 to be references on the probe card 43 are picked up by each of the cameras 38a and 38b of the left and right work table 31a and 31b. The coordinate positions of the electrodes 45 are obtained on the basis of the positions of the work tables 31a and 31b in these states. With these steps, the position of the probe card 43 relative to each of the left and right reference coordinate positions is obtained as a whole. The initialization described above is performed prior to the examination of the LCD panels ST, such as when the probe apparatus 1 is installed.

When the LCD panels ST are examined by the probe apparatus 1, each of the work tables 31a and 31b is moved to the alignment position and then the images of an LCD panel ST, e.g., two marks, are picked up by each of the upper side cameras 27a and 27b. By doing so, data about relative positions of the LCD panel on each of the work tables 31a and 31b in relation to the probe card 43 is obtained. An optical alignment operation for the LCD panel ST can be performed by moving each of the left work tables 31a and 31b in the X, Y and 74 directions on the basis of the data.

During the examination, one of the left work table 31a of the left alignment area 22a and the right work table 31b of the right alignment area 22b, for example, as shown in FIG. 5A, the right work table 31b onto which the LCD panel ST is loaded, is moved to the panel examining position of the examination area 21.

During the examination of the panel on the right work table 31b, the left stage 23a is moved to the standby position of the left alignment area 22a. In this state, the left work table 31a is moved to the panel reception position as shown in FIG. 5A. In this position, the examined LCD panel ST on the left work table 31 is received by the panel transfer robot 61 and transferred thereby to the LCD panel store section 2, thus storing it in a predetermined one of the LCD panel storing shelves 13 of the LCD panel storing cassette 12.

After the examined LCD panel ST is stored in the LCD panel storing cassette 12, the next LCD panel ST to be examined is taken out of the LCD panel storing cassette 12 by the panel transfer robot 61.

The taken-out LCD panel ST is transferred toward the left alignment area 22a by the robot 61, and supplied to the left work table 31a standing by in the panel reception position.

By doing so, after a new LCD panel ST to be examined is set in the left work table 31a, the ball screw mechanism 33a is driven, and the left work table 31a is moved to the alignment position as shown in FIG. 5B. In this alignment position, the LCD panel ST on the left work table 31a is located just under the CCD camera 27a of the alignment optical system. The left work table 31a is moved in the three X, Y and θ directions on the basis of an image picked up by the CCD camera 27a thereby to optically align the LCD panel on the left work table 31a. At this time, the panel transfer robot 61 is moved to the position corresponding to the right alignment area 22b and then stands by therein.

After the LCD panel ST on the right work table 31b has been examined in the examination area 21, the right ball screw mechanism 26b is driven, and the right stage 23b is operated to move to the standby position on the right alignment area 22b, as shown in FIG. 6A. Then the ball screw mechanism 33b is driven and the right work table 31b is moved to the panel reception position. The apparatus of this embodiment can be so constituted that both the right ball screw mechanism 26b and ball screw mechanism 33b can be driven at the same time.

At this time, the optical alignment of the LCD panel ST on the left work table 31a is completed in the left alignment area 22a, and the LCD panel ST is held in the standby state. For this reason, in accordance with the movement of the right work table 31b from the examination area 21 to the right alignment area 22b, the left ball screw mechanism 26a is driven, and the left work table 31a is moved to the panel examination position of the examination area 21 as shown in FIG. 6B. The LCD panel ST on the left work table 31a is thus examined in the examination area 21.

During the examination of the panel on the left work table 31a, the right work table 31b of the right alignment area 22b is held in the panel reception position, while the examined LCD panel on the right work table 31b is received by the panel transfer robot 61. The examined LCD panel ST is transferred to the LCD panel store section 2 by the panel transfer robot 61 and then stored in a predetermined one of the LCD panel storing shelves 13 of the LCD panel storing cassette 12.

After the examined LCD panel ST is stored in the LCD panel storing cassette 12, the next LCD panel ST to be examined is taken out of the LCD panel storing cassette 12 by the panel transfer robot 61, as in the case described above. The taken-out LCD panel ST is transferred to the right alignment area 22b by the robot 61, and supplied to the right work table 31b standing by in the panel reception position, as shown in FIG. 7A.

By doing so, after a new LCD panel ST to be examined is set in the right work table 31b, the ball screw mechanism 33b is driven, and the right work table 31b is moved to the alignment position, as shown in FIG. 7B. In this alignment position, the LCD panel ST on the right work table 31b is located just under the CCD camera 27b of the alignment optical system. The right work table 31b is moved in the three X, Y and θ directions on the basis of an image picked up by the CCD camera 27b thereby to optically align the LCD panel on the right work table 31b. At this time, the panel transfer robot 61 is moved to the position corresponding to the left alignment area 22a and then stands by therein.

After the LCD panel ST on the left work table 31a has been examined in the examination area 21, the left ball screw mechanism 26a is driven, and the left stage 23a is operated to move to the standby position on the left alignment area 22a. At the same time, the ball screw mechanism 33a is driven and the left work table 31a is moved to the panel reception position. At this time, the optical alignment of the LCD panel ST on the right work table 31b is completed in the right alignment area 22b, and the LCD panel ST is held in the standby state. In accordance with the movement of the left work table 31a from the examination area 21 to the left alignment area 22a, the right work table 31b is moved to the panel examination position of the examination area 21.

The same operation is repeated afterward, and the work tables 31a and 31b of the left and right alignment areas 22a and 22b are alternately moved to the examination area 21 for each examination of the LCD panel.

The foregoing embodiment produces the following advantages. More specifically, while the LCD panel loaded onto one of the work tables, e.g., the left work table 31a of the left alignment area 22a, which is moved to the examination area 21, is being examined, the next LCD panel ST to be examined can be set in advance in the other work table, i.e., the right work table 31b which stands by in the right alignment area 22b. Therefore, when the current examination of the LCD panel ST is completed and then the work table 31a is moved from the examination area 21 to the left alignment area 22a along with the examined LCD panel ST, the work table 31b of the right alignment area 22b in which the LCD panel to be examined next is preset, can be moved right to the examination area 21. For this reason, the time required from when the current examination of the LCD panel is finished until the LCD panel to be examined next is set in the examination area 21, can be shortened greatly, as compared with that in the conventional case. More specifically, the ratio of the standby time of the examination area 21 to the time period during which the LCD panel ST is being examined in the examination area 21, can be decreased, the operation time of the examination area 21 can be lengthened, and the number of LCD panels to be examined can greatly be increased per unit of time.

Furthermore, since the left ball screw mechanism 26a for driving the left stage 23a of the left alignment area 22a and the right ball screw mechanism 26b for driving the right stage 23b of the right alignment area 22b are provided separately from each other to allow the work tables 31a and 31b of the alignment areas 22a and 22b to be moved independently of each other, the LCD panel ST can be aligned at high precision for each of the work tables 31a and 31b.

Figure 8:
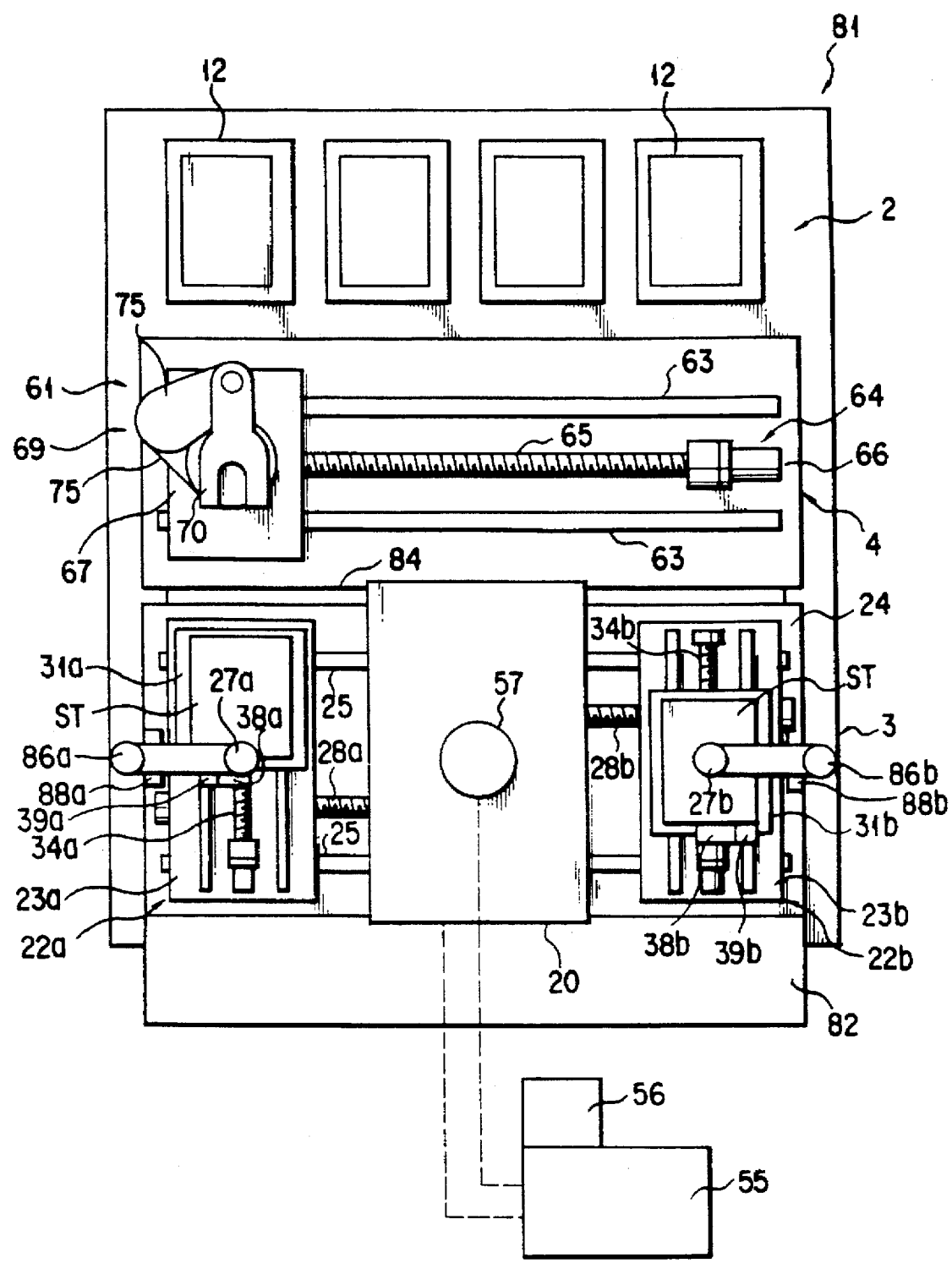
FIG. 8 is a plan view schematically showing the constitution of the entire probe apparatus according to another embodiment of the present invention.

FIG. 8 schematically shows the constitution of the whole probe apparatus 81, which is incorporated into a lighting inspection system for LCD panels, according to another embodiment of the present invention. In FIG. 8, the same constituting elements as those of FIG. 1 are denoted by the same reference numerals and their detailed descriptions are omitted.

The probe apparatus 81 shown in FIG. 8 differs from that shown in FIG. 1 in that an examination area includes left and right two examination areas 21a and 21b. Thus, an examination mechanism 20 can be moved right and left, and CCD cameras 27a and 27b serving as an alignment optical system can be whirled and retreated.

More specifically, the examination mechanism 20 bridges between an examination mechanism driving means 82 and a guide rail 84 and slides along the guide rail 84. The driving means 82 is connected to a controller 51 (see FIG. 4) and thus the examination mechanism 20 can be moved right and left in FIG. 8 under the control of the controller 51. A camera 57 is fixed to the examination mechanism 20 and moved together therewith.

Supporting arms of the cameras 27a and 27b are attached to vertical shafts 86a and 86b which are rotated by driving motors 88a and 88b. The driving motors 88a and 88b are also connected to the controller 51 and thus the cameras 27a and 27b can be whirled with regard to the axes of the shafts 86a and 86b under the control of the controller 51.

Figure 9A:
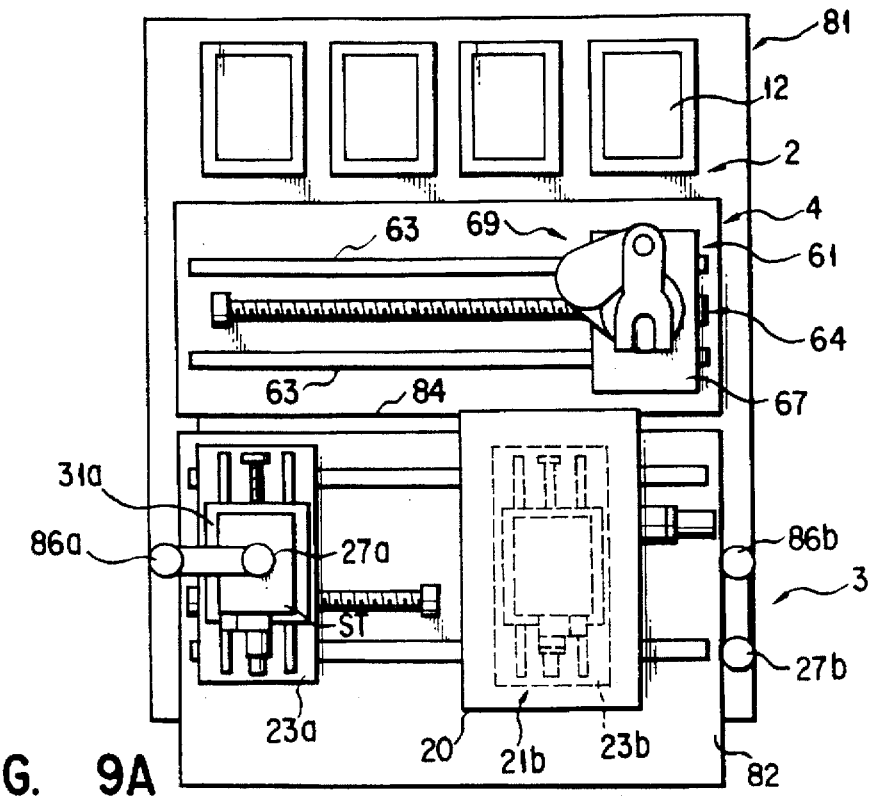
FIG. 9A is a plan view showing the prober apparatus of FIG. 8 in which the LCD panel on the left work table is aligned during the examination of the LCD panel on the right work table.
Figure 9B:
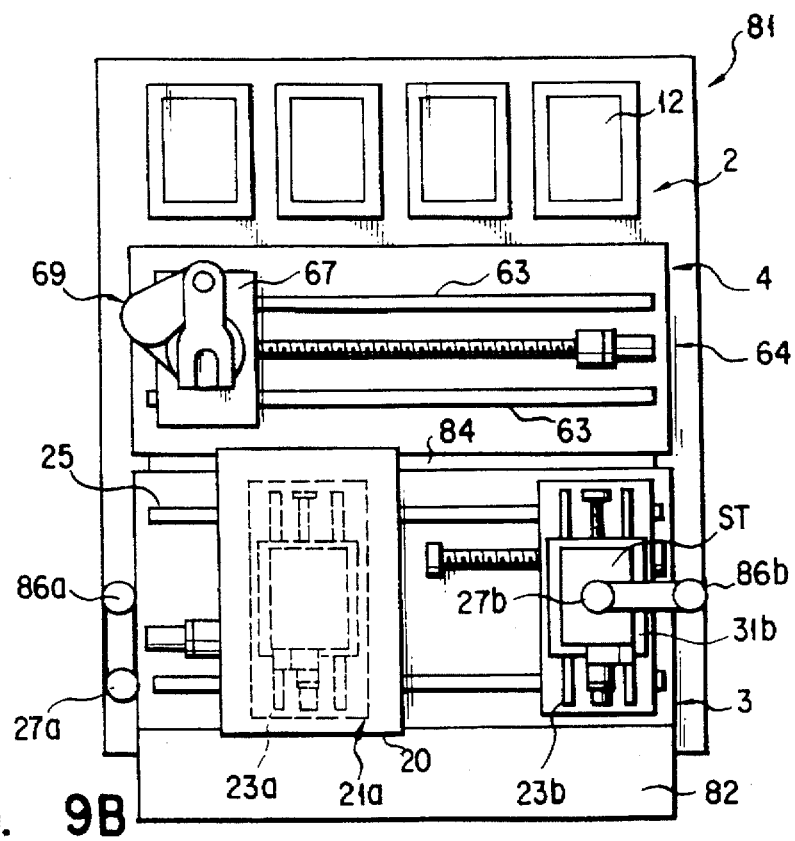
FIG. 9B is a plan view showing the probe apparatus of FIG. 8 in which the LCD panel on the right work table is aligned during the examination of the LCD panel on the left work table.

FIGS. 9A and 9B show an operation of the probe apparatus illustrated in FIG. 8. This embodiment is the same as that illustrated in FIG. 1 in that the controller 51 is operated such that the examination mechanism 20 alternately inspects an LCD panel ST on a left work table 31a and that on a right work table 31b. As shown in FIG. 1, the controller 51 drives the work tables 31a and 31b, a transfer robot 61, and the like to receive and align the LCD panels ST, and operates an examination mechanism driving means 82 to drive the examination mechanism 20 in accordance with the movement of the work tables 31a and 31b.

FIG. 9A shows an examining state of an LCD panel loaded on the right work table 31b, and this state almost corresponds to that shown in FIG. 5B. The examination mechanism 20 and right work table 31b are located in a right panel examining position within the right examination area 21a such that the LCD panel falls within a field of view of the camera 57. The camera 27b is whirled and retreated toward the side of the apparatus so as not to interfere with the examination mechanism 20. The right panel examining position is located almost halfway between the examination mechanism 20 and right work table 31b in FIG. 8, that is, between the original position of the examination mechanism 20 and the standby position of the right stage 23b. The right stage 23b, on which the right work table 31b is put, and the examination mechanism 20 simultaneously move from their positions in FIG. 8 so as to approach each other, and stop in the right panel examining position.

FIG. 9B shows an examining state of an LCD panel loaded on the left work table 31a, and this state almost corresponds to that shown in FIG. 7B. The examination mechanism 20 and left work table 31a are located in a left panel examining position within the left examination area 21b such that the LCD panel falls within a field of view of the camera 57. The camera 27a is whirled and retreated toward the side of the apparatus so as not to interfere with the examination mechanism 20. The left panel examining position is located almost halfway between the examination mechanism 20 and left work table 31a in FIG. 8, that is, between the original position of the examination mechanism 20 and the standby position of the left stage 23a. The left stage 23a, on which the left work table 31a is put, and the examination mechanism 20 simultaneously move from their positions in FIG. 8 so as to approach each other, and stop in the left panel examining position.

As described above, according to the embodiment shown in FIG. 8, since the examination mechanism 20 is movable, the time required for setting an LCD panel ST to be examined is set in the panel examining position can be shortened. Consequently, in this embodiment, the number of panels to be examined can be increased per unit of time more than that in the embodiment shown in FIG. 1.

FIG. 10 schematically shows the constitution of the whole probe apparatus 91, which is incorporated into a lighting inspection system for LCD panels, according to still another embodiment of the present invention. In FIG. 10, the same constituting elements as those of FIGS. 1 and 8 are denoted by the same reference numerals and their detailed descriptions are omitted.

The probe apparatus 91 shown in FIG. 10 differs from those shown in FIGS. 1 and 8 in that left and right alignment areas 22a and 22b also serve as left and right examination areas. Thus, an examination mechanism 20 can be moved right and left, and CCD cameras 27a and 27b employed as an alignment optical system can be whirled and retreated.

More specifically, left and right stages 23a and 23b are fixed, and only the examination mechanism 20 is moved right and left when the left and right work tables 31a and 31b are aligned with the examination mechanism 20. The examination mechanism 20 is formed more compact than those shown in FIGS. 1 and 8. Like in the embodiment shown in FIG. 8, the examination mechanism 20 bridges between an examination mechanism driving means 82 and a guide rail 84 and slides along the guide rail 84. A camera 57 is fixed to the examination mechanism 20 and moved together therewith. Also, like in the embodiment shown in FIG. 8, the cameras 27a and 27b can be whirled with regard to the axes of the shafts 86a and 86b.

The embodiment shown in FIG. 10 is the same as those illustrated in FIGS. 1 and 8 in that the controller 51 is operated such that the examination mechanism 20 alternately inspects an LCD panel ST on a left work table 31a and that on a right work table 31b. As in the embodiment illustrated in FIG. 1, the controller 51 drives the work tables 31a and 31b, a transfer robot 61, and the like to receive and align the LCD panels ST, and operates an examination mechanism driving means 82 to drive the examination mechanism 20 in accordance with the movement of the transfer robot 61.

In this embodiment, when the LCD panel on the right work table 31b is examined, the examination mechanism 20 is moved toward the left work table 31a, i.e., to the left-hand side in FIG. 10. The examination mechanism 20 is then stopped in a position where the LCD panel falls within a field of view of the camera 57, i.e., in a left panel examining position. At this time, the camera 27 is whirled and retreated toward the side of the apparatus so as not to interfere with the examination mechanism 20.

As described above, according to the embodiment shown in FIG. 10, since only the examination mechanism 20 is moved left and right to be aligned with the left and right work tables 31a and 31b, the aligned LCD panel ST need not be moved.

FIGS. 11A and 11B are a plan view and a side view both showing the major part of a probe apparatus according to yet another embodiment of the present invention. This embodiment is concerned with an improvement in the process section 3 of the probe apparatus 1 shown in FIG. 1 and featured in the mechanism for optically detecting LCD panels in right and left alignment areas and aligning them. A store section 2 and a transfer section 4 can be constituted in the same manner as those of the embodiment shown in FIG. 1. As described above, since the structures and operations of the respective members in the right and left alignment areas of the process section 3 are symmetrical, only the right alignment area will now be described.

A work table 103 onto which a panel ST to be processed is loaded, can be moved in X and Y directions crossing at right angles and Z direction (up and down) within a horizontal plane and rotated in direction θ on the Z axis. The work table 103 includes a means for fixedly holding the panel ST, such as a vacuum chuck. The worktable 103 is supported by a block 109 movable in the X and Y direction and driven in the Z and θ directions by a driving section 110 having a Z-direction driving motor 121 and a θ-direction driving motor 122 (see FIG. 14) both included in the block 109.

Figure 12:
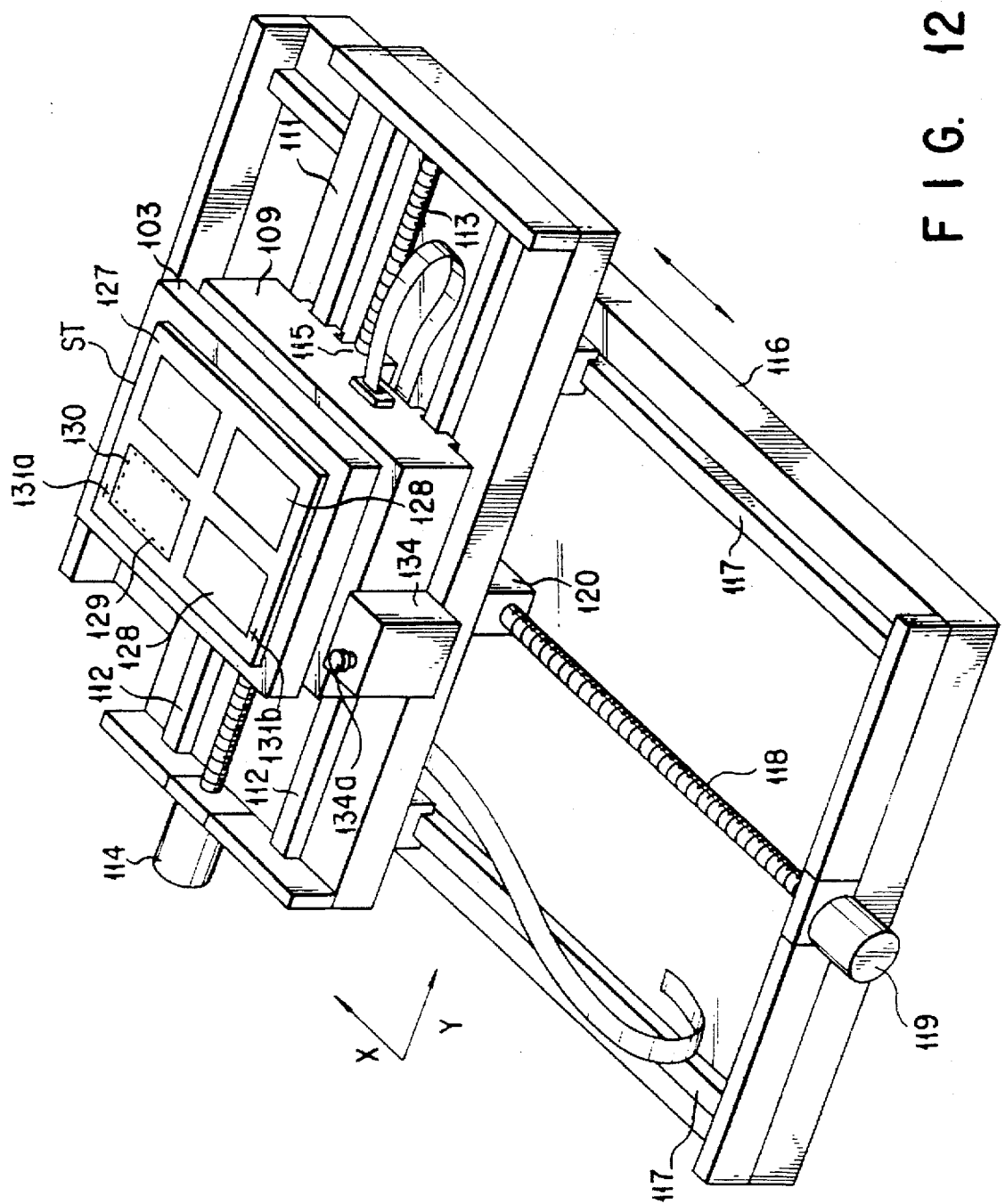
FIG. 12 is a perspective view showing means for driving the work tables of the probe apparatus shown in FIGS. 11A and 11B.

As is illustrated in FIG. 12, a Y base 111 is provided under the block 109. On the Y base 111, two guide rails 112 are arranged in parallel and extend in the Y direction, a ball screw 113 extends in the Y direction, and a driving motor 114 for rotating the ball screw 113 is provided. The block 109 is supported on the guide rails 112 and movable in the Y direction by means of a bearing member (not shown). A projection 115 having a screw hole into which the ball screw 113 is fitted, is projected from the undersurface of the block 109. When the ball screw 113 rotates, the block 109 can be moved in the Y direction while being guided along the guide rails 112.

An X base 116 is provided under the Y base 111. On the X base 116, two guide rails 117 are arranged in parallel and extend in the X direction, a ball screw 118 extends in the X direction, and a driving motor 119 for rotating the ball screw 118 is provided. The Y base 111 is supported on the guide rails 117 in the X direction by means of a bearing member (not shown). A projection 120 having a screw hole into which the ball screw 118 is fitted, is projected from the undersurface of the Y base 111. When the ball screw 118 rotates, the Y base 111 can be moved in the X direction while being guided along the guide rails 117.

Figure 14:
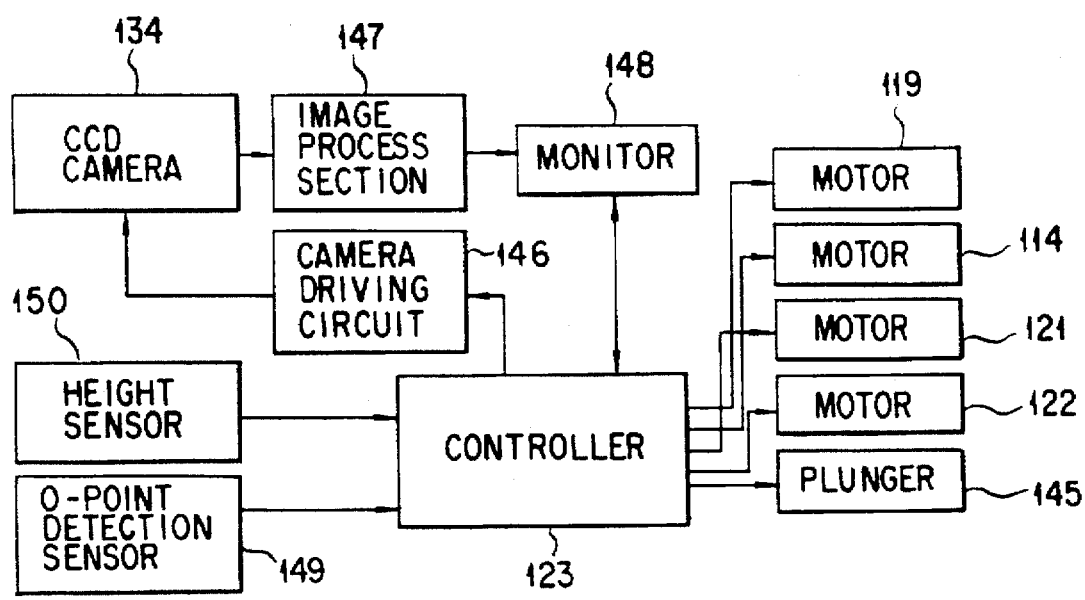
FIG. 14 is a view schematically showing the connecting state of a controller of the probe apparatus shown in FIGS. 11A and 11B.

As shown in FIG. 14, the driving motors 119, 114, 121 and 122 in the X, Y, Z and θ directions, respectively are each constituted of, e.g., a pulse motor. Each of these driving motors is connected to a controller 123 including a microcomputer and its peripheral circuits. The operation of each of the driving motors is controlled in response to a control signal output from the controller 123. The controller 123 corresponds to the controller 51 shown in FIG. 4.

A head plate 124 is provided above the process section 3 so as to surround a moving area of the work table 103 in the X and Y directions. The head plate 124 has an opening 124a which is located opposite to the panel ST loaded on the work table 103 in the examination position. A probe card 125 connected to a tester 55 for examining the panel ST, is fixed onto the periphery of the opening 124a, with a holder 126 interposed therebetween.

As has been described with regard to the embodiments shown in FIGS. 1 to 10, there are various types of panels ST to be processed, e.g., a glass substrate on which a single LCD device is formed, and a glass substrate 127 on which four LCD devices 128 are formed independently of one another, as shown in FIG. 16. In the embodiments shown in FIGS. 1 to 10, too, the panel as shown in FIG. 16 can be employed.

Referring to FIG. 16, a number of electrode pads 129, each of which is to be connected to the drain line of TFTs, are arranged along the two parallel sides of each of the LCD devices 128, while a number of electrode pads 130, each of which is to be connected to the gate line of the TFTs, are arranged along one of the remaining sides perpendicular to the parallel sides. Furthermore, two aligning marks, e.g., cross marks 131a and 131b are formed on the panel ST along the line parallel to one side of the panel ST.

Figure 13:
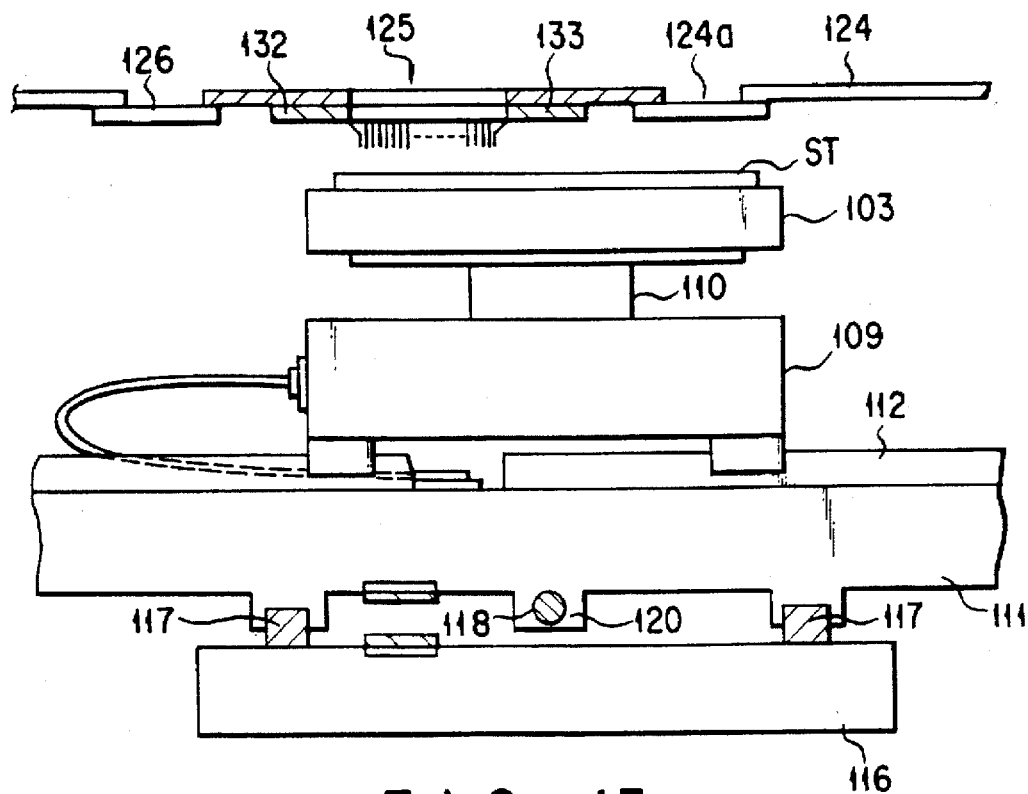
FIG. 13 is a longitudinal side view showing part of the probe apparatus of FIGS. 11A and 11B in which a work table is transferred to an examination position.

In the probe card 125 for examining the panel, as shown in FIG. 13, a number of probe electrodes 133 are arranged on the undersurface of a body 132 of the probe card 125 in accordance with the arrangement of each of the electrode pads 129 and 130.

A CCD camera 134 is fixed to one side of the block 109, which is moved in the X and Y directions, with an image pickup lens 134a upward. During the movement of the work table 103 in the X and Y directions, the probe electrodes 133 of the probe card 125 can be photographed by the CCD camera 134. The CCD camera 134 need not photograph all the probe electrodes and has only to do any two of them (for example, the probe electrodes which are the nearest to and the farthest from the CCD camera 134 moving in the X and Y directions) serving as reference electrodes.

An alignment optical system 135 is provided on the head plate 124. The alignment optical system 135 includes a main body 136 having a light source 137, a first reflector 138, a second reflector 139, a third reflector 140, and a driving member 141 for driving the third reflector 140.

The first reflector 138 is disposed so as to face the CCD camera 134 when the work table 103 is transferred to the alignment position within the alignment area. The second and third reflectors 139 and 140 are arranged so as to face the two cross marks 131a and 131b (first cross mark 131a far from the CCD camera 134 and second cross mark 131b near thereto), respectively.

The first reflector 138 crosses the optical axis of the CCD camera 134 at an angle of 45° and faces toward the second and third reflectors 130 and 140. The second and third reflectors 139 and 140 each cross the vertical line at an angle of 45° and face the first reflector 138. As shown in FIG. 15, when the work table 103 is transferred to the alignment position, a first opening 142 is formed in the head plate 124 between the CCD camera 134 and first reflector 138, and second and third openings 143 and 144 are formed therein between the cross mark 131a and second reflector 139 and between the cross mark 131b and third reflector 140, respectively. The first to third openings 142 to 144 of the head plate 124 each can be formed as a long hole.

The driving member 141 of the third reflector 140 is provided with, e.g., an electromagnetic plunger 145, as illustrated in FIGS. 20A and 20B. The third reflector 140 is fixed to the distal end of a movable rod 145a of the plunger 145. The plunger 145 is also connected to the controller 123. The controller 123 controls an operation of the electromagnetic plunger 145 to move the third reflector 140 in a direction perpendicular to an optical path $Q_1$ between the first and second reflectors 138 and 139, thereby selectively moving the third reflector 140 to a set position (shown in FIG. 20B) on the optical path $Q_1$ and a standby position (shown in FIG. 20A) outside the optical path $Q_1$.

The first reflector 138 is formed of, e.g., a half mirror. The light emitted from the light source 137 is transmitted through the first reflector 138 and then reflected toward the cross mark 131a or 131b by the second reflector 139 or third reflector 140. The cross mark 131a or 131b is thus illuminated, and its image is reflected toward the first reflector 138 by the reflector 139 or 140 and then toward the CCD camera 134 by the first reflector 138. As a result, the images of the cross marks 131a and 131b are separately picked up by the CCD camera 134 in accordance with a selecting operation of the third reflector 140.

The CCD camera 134 is connected to the controller 123 via a camera driving circuit 146. A monitor 148 is connected to the CCD camera 134 via an image process section 147. The monitor 148 is connected to the controller 123. The CCD camera 134 and monitor 148 are driven in response to a control signal output from the controller 123. The image information supplied from the CCD camera 134 is processed by the image process section 147 and then displayed on the monitor 148.

The controller 123 controls the position of the panel ST on the basis of positional information of images of the first and second cross marks 131a and 131b which are supplied separately from the CCD camera 134. Based on the positional information, the controller 123 calculates an amount of shift of the panel ST, which is loaded onto the work table in the alignment position, in each of the X, Y and ° directions. Based on the calculation result, the controller controls the operations of the driving motors 19, 14 and 22 in the X, Y and θ directions such that the amount of shift of the work table 103 in each of the directions becomes zero while the work table 103 is moving from the alignment position to the examination position.

A zero-point detecting sensor 149 for detecting a zero point in the Z direction and a height sensor 150 for detecting the height of panel ST (distance between the zero point in the Z direction and panel ST) are connected to the controller 123. The zero point is set in a position where the electrode pads 129 and 130 of the panel ST contact the probe electrodes 133 of the probe card 125, when the work table 103 is raised in the examination position.

Figure 17A:
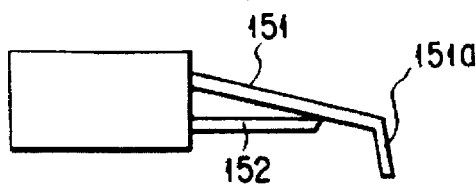
FIGS. 17A and 17B are views showing different examples of a zero-point sensor of the probe apparatus shown in FIGS. 11A and 11B.
Figure 17B:
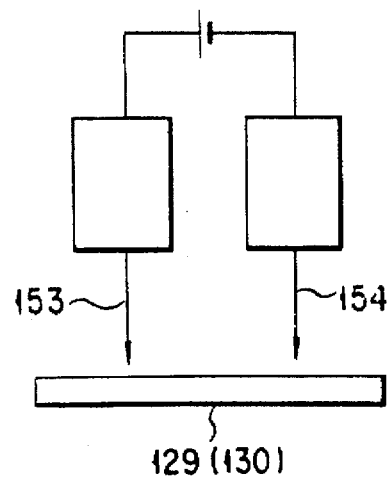

Examples of the sensor 149 are shown in FIGS. 17A and 17B. The zero-point detecting sensor 149 shown in FIG. 17A is provided with two opposing contact plates 151 and 152 with a distance therebetween. The upper contact plate 151 is inclined downward such that the distal end of the lower contact plate 152 is in contact with the inside of the upper contact plate 151. The upper contact plate 151 has a bent portion 151a which is bent downward near its distal end. The proximal ends of the contact plates 151 and 152 is connected to a zero-point detecting circuit (not shown). In the natural state, i.e., in the examination state of panel ST, the zero-point detecting sensor 149 is held, with the contact plates 151 and 152 are in contact with each other.

When the work table 103 rises in the Z direction from the standby position, the panel ST on the table 103 is brought into contact with the bent portion 151a of the upper contact plate 151. As the work table 103 rises, the bent portion 151a of the upper contact plate 151 is pressed upward by the panel ST and elastically deformed in which direction it is separated from the lower contact plate 152. When the contact plates 151 and 152 are separated from each other, the conduction between the contact plates 151 and 152 is cut. This state is detected by the zero-point detecting circuit and recognized as a state where the panel ST on the work table 103 rising in the Z direction from the standby position reaches the zero point in the Z direction.

The zero-point detecting sensor 149 shown in FIG. 17B is provided with two parallel spring needles 153 and 154 extending in the Z direction. The upper end portions of the spring needles 153 and 154 are connected to the zero-point detecting circuit (not shown), while the lower end portions thereof are so located that they can contact any one of the electrode pads 129 and 130 of the panel ST.

When the work table 103 rises in the Z direction from the standby position, the lower end portions of the spring needles 153 and 154 contact any one of the electrode pads 129 and 130 of the panel ST on the work table 103. At this time, both the spring needles 153 and 154 are rendered conductive by one of the electrode pads 129 and 130. This state is detected by the zero-point detecting circuit and recognized as a state where the panel ST on the work table 103 rising in the Z direction from the standby position reaches the zero point in the Z direction.

For example, the height sensor 150 can be so constituted that it comprises a light emitting source such as an LED (light emitting diode) and a light receiving element such as a photosensor, and the light receiving element detects light, which is emitted from the light emitting source and reflected by the surface of the panel ST on the work table 103, and the height of the surface of the panel ST in the Z direction can thus be detected, without bringing the height sensor into contact with the panel ST.

The height sensor 150 can also be so constituted that it detects an amount of space charge between the sensor 150 and panel ST on the work table 103 and the height of the surface of the panel ST in the Z direction can thus be detected according to variations in the amount of space charge, without placing the sensor into contact with the panel, and that it includes an automatic focus mechanism to detect the height of the surface of the panel ST on the work table 103 in the Z direction can be detected without bringing the sensor into contact with the panel.

An operation of the probe apparatus shown in FIGS. 11A and 11B will now be described.

The operations of unloading an examined panel ST from the work table 103 and loading a panel ST onto the work table 103, are performed in the same manner as those in the embodiment shown in FIG. 1. In other words, a panel which has been examined or is to be examined is transferred by the transfer robot 61 (shown in FIG. 1) when the work table 103 is moved to the panel reception position.

The work table 103 on which a panel ST to be examined is loaded in the reception position, is moved to the examination position located under the probe card 25. In this embodiment, the original position of the work table 103 is set to the examination position in controlling the operation of the apparatus. The height of the panel ST is detected by the height sensor 150 during the movement of the panel to the examination position therefore. When the work table 103 arrives at the examination position, the height of the panel ST in the Z direction, that is, the distance between the panel ST and zero point in the Z direction is correctly measured. Detection data output from the height sensor 150 is supplied to the controller 123 and stored in a memory thereof. The zero point in the Z direction is preset by the zero-point detecting sensor 149.

After the work table 103 on which the panel ST to be examined is set is transferred to the examination position (original position), the X-direction driving motor 119 is driven and the work table 103 is moved in the X direction from the examination position to the alignment position. While the work table is moving from the examination position to the alignment position, if the CCD camera 134 alongside the work table 103 is moved under any two of probe electrodes 133 each serving as a reference electrode of the probe card 125, the probe electrodes 133 of the probe card 125 are photographed by the CCD camera 134. When the center of the view of the CCD camera 134 coincides with that of each probe electrode 133, XY coordinates, which correspond to the distance by which the work table 103 moves in the X and Y directions from the origin, are detected. The coordinate position $(x_1, Y_1)$ is set to "0" as the reference coordinate position of the work table 103, and the coordinate positions of the probe electrodes 133 are obtained.

When the work table 103 is moved to the alignment position indicated by the virtual line in FIG. 11B, the X-direction driving motor is stopped. The amount of movement from the reference coordinate position to the alignment position is set properly in accordance with the panel size of the panel ST.

Subsequently, the actual position of the panel ST is calculated in the alignment position. The position of the panel ST is calculated as follows by using the alignment optical system 135. First the electromagnetic plunger 145 of the driving member 141 of the third reflector 140 is driven and, as shown in FIG. 20A, the third reflector 140 is held in the standby position outside the optical path $Q_1$ between the first and second reflectors 138 and 139.

In this state, the light emitted from the light source 137 is transmitted through the first reflector 138 and then totally reflected by the second reflector 139 toward the first cross mark 131a which is farthest from the CCD camera 134, thereby illuminating the cross mark 131a. The image of the first cross mark 131a is totally reflected toward the first reflector 138 by the second reflector 139 and then reflected toward the CCD camera 134 by the first reflector 138, with the result that the image of the first cross mark 131a is picked up by the CCD camera 134. At this time, an amount of shift $(x_2, Y_2)$ of the image of the first cross mark 131a displayed on the monitor 148 from the center of the view of the CCD camera 134, is detected.

After the image of the first cross mark 131a is detected, the electromagnetic plunger 145 is driven and, as shown in FIG. 20B, the third reflector 140 is switched to the set position within the optical path $Q_1$ between the first and second reflectors 138 and 139.

In this state, the light emitted from the light source 137 is transmitted through the first reflector 138 and then totally reflected by the third reflector 140 toward the second cross mark 131b which is close to the CCD camera 134, thereby illuminating the cross mark 131b. The image of the second cross mark 131b is totally reflected toward the first reflector 138 by the third reflector 140 and then reflected toward the CCD camera 134 by the first reflector 138, with the result that the image of the second cross mark 131b is picked up by the CCD camera 134. At this time, an amount of shift ($x_3$, $Y_3$) of the image of the second cross mark 131b displayed on the monitor 148 from the center of the view of the CCD camera 134, is detected.

Figure 19:
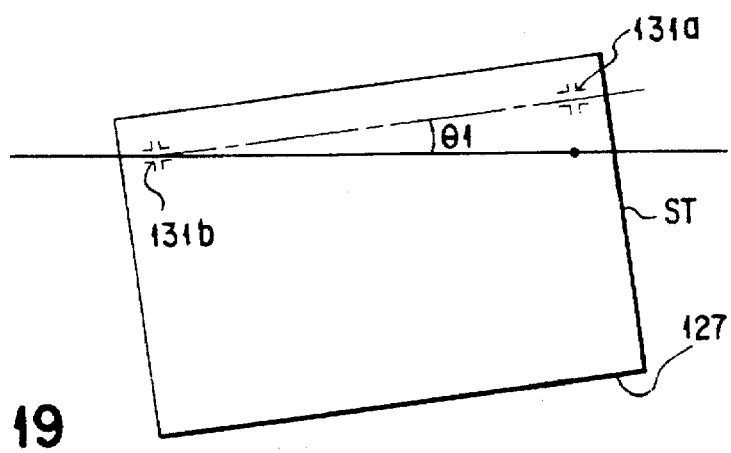
FIG. 19 is a view illustrating the positioning of the LCD panel in the probe apparatus of FIGS. 11A and 11B.

Based on detection data of the above amounts of shift of the images of the first and second cross marks 131a and 131b, the amount of shift of the panel ST in each of the X, Y and θ directions is detected as shown in FIG. 19.

After the amounts of shift of the panel ST on the work table 103 in the X, Y and θ directions are calculated, the X-direction driving motor 119 is rotated reversely, and the work table 103 is moved from the alignment position to the examination position (original position) of the panel ST. In response to the control signal from the controller 123, the operation of a rotation mechanism 8, which is driven in the X, Y, Z and θ directions, is so controlled that the amounts of shift of the panel ST in the X, Y and θ directions become zero. For this reason, when the work table 103 arrives at the examination position (original position) of the panel ST, the amounts of shift of the panel thereon in the X, Y and θ directions become zero, and the alignment of the panel ST is completed.

Figure 18A:
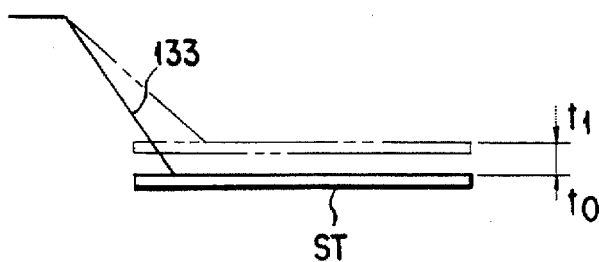
FIG. 18A is a view illustrating the LCD panel moving between a zero point and an overdrive point.

After the alignment of the panel ST is finished, the Z-direction driving motor 119 is driven, and the work table 103 is raised from the standby position under the zero point in the Z direction to the examination position of the panel ST. The amount of movement (rise) of the work table 103, which moves in the Z direction from the standby position, is then controlled on the basis of height information of the panel ST detected in advance by the height sensor 150. As is indicated by the solid line in FIG. 18A, the panel ST on the work table 103 is moved to the zero point $t_0$, and the electrode pads 129 and 130 of the panel ST are brought into contact with the probe electrodes 133 of the probe card 125. After that, the panel ST is raised to the preset appropriate overdrive position $t_1$ (e.g., to the height of about 200 μm), as indicated by the virtual line in FIG. 18A.

Figure 18B:
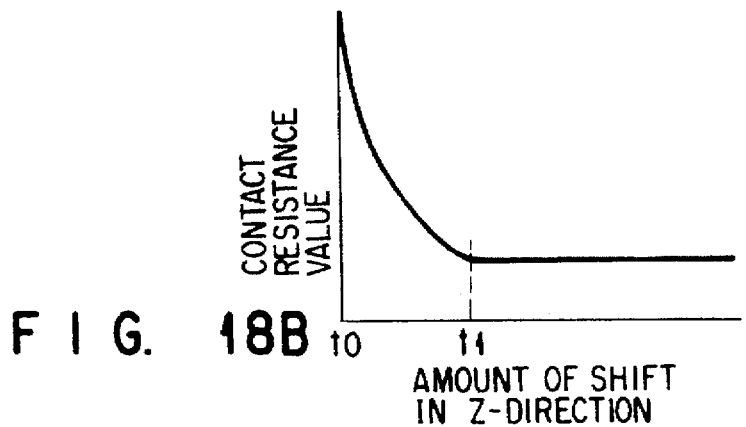
FIG. 18B is a characteristic view showing variations in value of contact resistance acting between the LCD panel and the probe when the LCD panel is overdriven in the Z direction from the zero point.

When the work table 103 rises up to the examination position of the panel ST, a proper pressure is applied between the electrode pads 129 and 130 and the probe electrodes 133 and, as shown in FIG. 18B, a stable state can be maintained so as to make the contact resistance between them almost constant. The panel ST is thus examined, with the work table 103 raised at the examination position of the panel ST.

This embodiment creates the following advantage. Since the CCD camera 134 for aligning the panel ST on the work table 103 is provided on one side of the block 109 alongside the work table 103, the operation space above the examination position of the main body of the LCD probe apparatus 1 is not likely to be narrowed.

The probe apparatus 1 of this embodiment includes the alignment optical system 135 for guiding the images of the cross marks 131a and 131b to the CCD camera 134 when the work table 103 is transferred to the alignment position, and the driving member 141 for driving the third reflector 140 is provided in the alignment optical system 135. If, therefore, the third reflector 140 is shifted outside the optical path $Q_1$ formed between the first and second reflectors 138 and 139 by the driving member 141, the image of the first cross mark 131a, which is far away from the CCD camera 134, can be reflected by the second reflector 139, directed to the first reflector 138, and then transmitted to the CCD camera through the first reflector 138. If the third reflector 140 is inserted in the optical path $Q_1$, the image of the second cross mark 131b, which is near to the CCD camera 134, can be reflected by the third reflector 140, directed to the first reflector 138, and transmitted to the CCD camera 134 through the first reflector 138.

In other words, since the images of the two cross marks 131a and 131b can be detected individually by the single CCD camera 134, two cameras need not be aligned with high precision, unlike in the case where the two cross marks are detected by their respective cameras. Consequently, the alignment of the panel can be efficiently performed, and the time required for making preparation to examine the panel ST can be shortened.

Moreover, since the probe electrodes 133 of the probe card 125 for examining the panel can be confirmed directly by the single CCD camera 134 for aligning the panel, the positional coordinates of the probe electrodes 133 can be correctly obtained, and dirt or the like can be examined on the screen of the monitor 148. This embodiment is thus effective in the probe card 125 having probe electrodes 133 with narrow pitches, such as spring probes and bumps, which are not seen when the distal ends of the probe electrodes contact the electrode pads 129 and 130 of the panel ST.

The height of the panel ST is detected by the height sensor 150 during the transfer of the panel, and the height of the panel ST in the Z direction, that is, the distance between the panel ST and the zero point in the Z direction is correctly measured when the work table 103 is transferred to the examination position of the panel ST. Therefore, when the work table 103 is raised from the standby position under the zero point in the Z direction to the examination position of the panel ST, the panel ST on the work table 103 can be correctly raised to the preset appropriate overdrive position on the basis of the measurement result obtained from the height sensor 150. It is thus unlikely that the work table 103 cannot be correctly raised to the overdrive position because of variations in thickness of the respective panels ST, but the panels ST can be always stably examined.

It is desirable to move at least one of the second and third reflectors 139 and 140 in parallel with the transferring direction of the work table 103. This can be attained by, for example, supporting the second reflector 139 by a reciprocate driving member 156. In this embodiment, the electromagnetic plunger 145 is provided as the driving member for driving the third reflector 140 in the alignment optical system 135. However, as shown in FIGS. 21A and 21B, the third reflector 140 can be fixed to a rotating shaft 161, and a rotating shutter type switching operation mechanism (rotating operation means) for rotatably moving the third reflector 140 between the set position indicated by the solid line in FIG. 21A and the standby position indicated by the virtual line therein by the use of a driving motor 162 coupled to the rotating shaft 161, can be provided. In FIGS. 21A and 21B, reference numeral 163 denotes a bearing member of the rotating shaft 161, 164 does a stopper for holding the third reflector 140 in the standby position, and 165 does another stopper for holding the third reflector 140 in the set position. Furthermore, the first to third reflectors 138 to 140 in the alignment optical system 135 can be replaced with total reflection prisms.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An apparatus for examining target objects, comprising:
   an examination mechanism provided within an examination area, for examining the target objects;
   first and second alignment areas between which the examination area is interposed, for aligning the target objects;
   first and second work tables onto which the target objects are to be loaded detachably;
   driving means for moving said first and second work tables within a horizontal plane, said driving means allowing said first work table to move between said first alignment area and said examination area and allowing said second work table to move between said second alignment area and said examination area; and
   control means for controlling said driving means such that said first and second work tables are moved in said first and second alignment areas, respectively, to align said target objects on said first and second work tables with a predetermined state corresponding to said examination mechanism, and said target objects on said first and second work tables are alternately examined within the examination area by said examination mechanism;
   wherein said apparatus is a probe apparatus used in a lighting inspection system for LCD panels as said target objects, said examination mechanism includes probe electrodes for supplying an electrical signal to the LCD panels, and said probe apparatus comprises a light source for supplying light to the LCD panels during the lighting inspection.

2. The apparatus according to claim 1, further comprising exchanging means for, while a target object on said first work table is being examined, unloading an examined target object from said second work table within said second alignment area and loading a new target object to be examined onto said second work table and for, while a target object on said second work table is being examined, unloading an examined target object from said first work table within said first alignment area and loading a new target object to be examined onto said first work table.

3. The apparatus according to claim 2, wherein said exchanging means and driving means are controlled in linkage by said control means.

4. The apparatus according to claim 3, wherein each of said first and second alignment areas includes a reception position where said target object is loaded/unloaded onto/from said work table corresponding thereto and an alignment position where said target object is aligned, and each of said first and second work tables is moved between the reception position and the alignment position by said driving means.

5. The apparatus according to claim 4, wherein said driving means includes first and second driving sections for driving said first and second work tables, respectively.

6. The apparatus according to claim 5, wherein each of said driving sections includes an X shifter for moving the work table corresponding thereto between the alignment position and the examination area and a Y shifter for moving the work table corresponding thereto between the alignment position and the reception position.

7. The apparatus according to claim 6, wherein each of said first and second work tables is movably in a vertical direction and rotatably supported on a block moved by the X and Y shifters, through a lifting member and a rotating member both controlled by said control means.

8. The apparatus according to claim 7, wherein said X and Y shifters, and said lifting and rotating members are controlled in linkage by said control means when the target objects are aligned.

9. The apparatus according to claim 8, wherein said exchanging means includes a store section for storing the target objects and transferring means, arranged between the store section and the alignment area, for transferring the target objects therebetween.

10. The apparatus according to claim 8, further comprising detection means, provided in accordance with the alignment position, for optically detecting the target objects and supplying information to said control means to align the target objects based on the information.

11. The apparatus according to claim 10, wherein said examination area includes first and second examination areas spaced away from each other, for examining the target objects on said first and second work tables, respectively, and said examination mechanism is movable between the first and second examination areas.

12. The apparatus according to claim 11, wherein said detection means is movable between a use position and a retreat position according to movement of said examination mechanism to prevent said detection means from interfering with said examination mechanism, and movement of said detection means is controlled by said control means.

13. The apparatus according to claim 1, wherein said examination mechanism includes an opening extending vertically in accordance with a view of a camera for viewing the LCD panels during the lighting inspection, and said probe electrodes are provided so as to surround the opening at a lower end thereof.

14. The apparatus according to claim 13, wherein said light source comprises a back light provided on each of said first and second work tables.

15. The apparatus according to claim 8, further comprising image pickup means moved together with said first and second work tables by said driving means and capable of picking up an image of a predetermined part of said examination mechanism, and an optical system, arranged in accordance with the alignment position, for guiding images of first and second marks formed on the target objects to said image pickup means, said control means controlling alignment of the target objects using the images of the first and second marks supplied from said image pickup means.

16. The apparatus according to claim 15, wherein said optical system comprises:
   a first reflector opposed to said image pickup means when said work tables are transferred to the alignment position;
   a second reflector opposed to the first mark far away from said image pickup means, said second reflector reflecting the image of the first mark toward said first reflector and transmitting the image of the first mark to said image pickup means through said first reflector;
   a third reflector arranged in an optical path between said first reflector and said second reflector and opposed to the second mark near to said image pickup means, said third reflector reflecting the image of the second mark toward said first reflector and transmitting the image of the second mark to said image pickup means through said first reflector; and switching means for switching said third reflector between a set position inserted in the optical path and a standby position shifted outside the optical path.

17. The apparatus according to claim 16, wherein said switching means moves said third reflector in a direction perpendicular to the optical path.

18. The apparatus according to claim 16, wherein said switching means rotates said third reflector between the set position and the standby position.

19. The apparatus according to claim 16, wherein one of said second reflector and said third reflector is supported by a driving member for moving said one of said second reflector member and said third reflector member in a horizontal direction.

* * * * *